United States Patent
Goodenough Welch et al.

(10) Patent No.: US 10,531,267 B2
(45) Date of Patent: Jan. 7, 2020

(54) PERSONAL SAFETY NETWORK

(71) Applicant: Mooseworks Development, LLC, Peterborough, NH (US)

(72) Inventors: Cynthia Goodenough Welch, Peterborough, NH (US); Keith C. Welch, Peterborough, NH (US)

(73) Assignee: Mooseworks Development, LLC, Peterborough, NH (US)

( * ) Notice: Subject to any disclaimer, the term of this patent is extended or adjusted under 35 U.S.C. 154(b) by 0 days.

(21) Appl. No.: 16/416,392

(22) Filed: May 20, 2019

(65) Prior Publication Data
US 2019/0373437 A1    Dec. 5, 2019

Related U.S. Application Data

(63) Continuation-in-part of application No. 15/996,376, filed on Jun. 1, 2018, now Pat. No. 10,375,560.

(51) Int. Cl.
*H04W 4/90* (2018.01)
*H04L 29/08* (2006.01)
*H04W 68/00* (2009.01)

(52) U.S. Cl.
CPC .............. *H04W 4/90* (2018.02); *H04L 67/12* (2013.01); *H04L 67/26* (2013.01); *H04W 68/005* (2013.01)

(58) Field of Classification Search
CPC ........ H04W 4/90; H04L 51/08; G06Q 10/107
See application file for complete search history.

(56) References Cited

U.S. PATENT DOCUMENTS

| | | |
|---|---|---|
| 8,483,654 B2 | 1/2013 | Levinson et al. |
| 8,624,727 B2 | 1/2014 | Saigh et al. |
| 8,634,810 B2 | 1/2014 | Barkie et al. |

(Continued)

OTHER PUBLICATIONS

Lindsay, Bruce, "Social Media and Disasters: Current Uses, Future Options, and Policy Considerations", Congressional Research Service, Sep. 6, 2011, United States.

(Continued)

*Primary Examiner* — Myron Wyche
(74) *Attorney, Agent, or Firm* — Cesari and McKenna, LLP

(57) ABSTRACT

A personal safety network (PSN) is provided in which authorized members of the network may rapidly and efficiently communicate with each other regarding threats, emergencies, or other circumstances. The PSN provides virtually real-time, multi-way messages among at least the members of a predetermined group of authorized members of the PSN. The PSN may integrate sensor data from security devices such as cameras, badge readers, and smart locks, with messages created by authorized members. The PSN may also include a location data database for maintaining virtually real-time location information for authorized members. Messages may be composed using speech recognition as an alternative to typing. A system administrator may provide temporary access to first responders or other authorized entities to message threads and underlying messages maintained by the PSN. Pre-processing and de-duplication methods are disclosed for managing congestion during periods when a large number of messages are received by the PSN.

20 Claims, 34 Drawing Sheets

(56) References Cited

U.S. PATENT DOCUMENTS

| | | | |
|---|---|---|---|
| 9,679,467 B2 | 6/2017 | Hibbs, Jr. et al. | |
| 9,881,489 B2 | 1/2018 | Hibbs | |
| 2012/0226759 A1 | 9/2012 | Lew | |
| 2013/0183924 A1 | 7/2013 | Saigh | |
| 2013/0218988 A1* | 8/2013 | Balannik | G06Q 10/107 709/206 |
| 2013/0346333 A1 | 12/2013 | Hassler et al. | |
| 2014/0025724 A1 | 1/2014 | Granger | |
| 2014/0153457 A1 | 5/2014 | Liu | |
| 2014/0161241 A1 | 6/2014 | Baranovskey | |
| 2014/0368337 A1 | 12/2014 | Venkatachari | |
| 2014/0379814 A1 | 12/2014 | Graff et al. | |
| 2015/0109123 A1 | 4/2015 | Ros | |
| 2015/0288632 A1* | 10/2015 | Zheng | H04L 51/08 709/206 |
| 2016/0189067 A1* | 6/2016 | Law | G06F 16/2322 705/34 |
| 2018/0139070 A1* | 5/2018 | Lin | H04L 12/28 |

OTHER PUBLICATIONS

International Search Report and Written Opinion for co-pending PCT Application No. PCT/US2019/033675 dated Aug. 29, 2019, 22 pages.

* cited by examiner

426

| Home | Users/Groups | Roles/Permissions | Archived Messages |

Manage Group

Name [Family]    428

Role [Family ▼]    430    Save    432    Import Users    434

Group Users

| Name | ID | Email | Phone | | | 436 |
|---|---|---|---|---|---|---|
| Lisa K | 9325 | lisa@apple.com | 555-9325 | Edit | Delete | |
| Jim W | 6885 | jim@gmail.com | 555-6885 | Edit | Delete | |
| Alice M | 3247 | alice@microsoft.com | 555-3247 | Edit | Delete | |
| Sam G | 1021 | sam@yahoo.com | 555-1021 | Edit | Delete | |
| | | | | Add | | |

Requests for New Users

| Member: | Name | Email | Phone | Relation | | | 438 |
|---|---|---|---|---|---|---|---|
| Lisa K | Dan G | dan@gmail.com | 555-1985 | Father | Approve | Disapprove | |

| Home | Users/Groups | Roles/Permissions | Archived Messages |

440 ↗
402 →

| Role Name | Admin | Add User | Approve User | Broadcast |
|---|---|---|---|---|
| Admin | ☑ | ☑ | ☑ | ☑ |
| Staff | ☐ | ☐ | ☐ | ☑ |
| Students | ☐ | ☑ | ☐ | ☑ |
| Family | ☐ | ☐ | ☑ | ☐ |
| Enter New Role Name | ☐ | ☐ | ☐ | ☐ |

442

Add

Save — 444

FIG. 4E

| Home | Users/Groups | Roles/Permissions | Archived Messages |

Search for: 🔍
Search Date: 03/10/2014
Search User:

| Date | Time | From | Last Message | |
|---|---|---|---|---|
| 5/18/18 | 3:25 PM | Lisa K | I see a man who doesn't look like he belongs here on the 1st floor. | Go to |
| 5/15/18 | 12:05 PM | Sam G | OK, thanks | Go to |
| 5/5/18 | 9:45 AM | Security | The fire is out now. All clear | Go to |
| 4/30/18 | 10:13 AM | Admin | Evacuate immediately using stairwell 2. | Go to |
| 4/25/18 | 1:23 PM | Security | It's the electrician. We're good. | Go to |
| 4/21/18 | 8:15 AM | Jim W | I see him on the 2nd floor. He has a torn up plaid shirt, and is carrying a duffel bag. | Go to |
| 4/17/18 | 2:36 PM | Mary G | Oh, good. | Go to |
| 4/15/18 | 3:42 PM | Security | I'll check it out. | Go to |
| 4/12/18 | 9:05 AM | Dan G | OK, I'll come by later today. | Go to |
| 4/5/18 | 11:15 AM | Admin | There will be a fire alarm test this afternoon. | Go to |
| 4/2/18 | 7:55 AM | Security | We've removed them. | Go to |

FIG. 4F

|  | Admin | Family | Security | Students | Teachers |
|---|---|---|---|---|---|
| Communications | ☐ | ☐ | ☐ | ☐ | ☐ |
| Door held open | ☐ | ☐ | ☑ | ☐ | ☐ |
| Forced Door | ☑ | ☐ | ☑ | ☐ | ☐ |
| Intrusion | ☑ | ☐ | ☑ | ☐ | ☐ |
| Invalid Credential | ☐ | ☐ | ☑ | ☐ | ☐ |
| Maintenance | ☑ | ☐ | ☐ | ☐ | ☐ |
| Output | ☐ | ☐ | ☐ | ☐ | ☐ |
| Power | ☑ | ☐ | ☐ | ☐ | ☐ |
| System | ☐ | ☐ | ☐ | ☐ | ☐ |
| System audit | ☐ | ☐ | ☐ | ☐ | ☐ |
| Tamper | ☑ | ☐ | ☑ | ☐ | ☐ |
| User audit | ☐ | ☐ | ☐ | ☐ | ☐ |
| Valid Credential | ☐ | ☐ | ☐ | ☑ | ☐ |
| Video | ☐ | ☐ | ☑ | ☐ | ☐ |

Save Notification Settings

FIG. 14

Today's Messages:

| Time | From | Last Message | |
|---|---|---|---|
| 3:28 PM | Admin | Use PSN to contact your parents and family | View Messages |
| 3:08 PM | Admin | All students please return to home room classes. School will let out at 2:05pm. | View Messages |
| 1:16 PM | Admin | bring them to front office now | View Messages |
| 12:50 PM | Admin | To all, we've had an incident in the parking lot. It's under control, and the police are coming. No one has been harmed, and we are all safe. We'll give you more news when we get it. | View Messages |

1704

1800

View 1 - 4 of 4

FIG. 18A

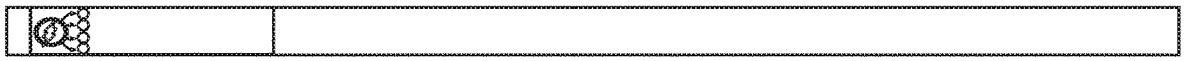

Messages

| Time | From | Message | Recipients | |
|---|---|---|---|---|
| 3:28 PM | Admin | Use PSN to contact your parents and family | ALL | Location |
| 3:27 PM | Admin | All students and staff, please gather at the football field | ALL | Location |
| 3:27 PM | Security-Brett Gilson | We have him, there are injuries, calling for EMTs | ALL | Location |
| 3:26 PM | Admin | People in 205, evacuate if you can using the rear stairwell. Rooms in the front, lock down. | ALL | Location |
| 3:26 PM | Security-Brett Gilson | We're on the way. | ALL | Location |
| 3:26 PM | Jim Welch | He's trying to get into room 221 | ALL | Location |
| 3:26 PM | Joan T. Baxter | It's coming from the front of the building | ALL | Location |
| 3:26 PM | Admin | People on the first floor of 205, evacuate now. All other buildings, evacuate to the west parking lot. | ALL | Location |
| 3:25 PM | Kevin A. | It's in building 205, 2nd floor | ALL | Location |

View 1 - 10 of 10

FIG. 18B

PERSONAL SAFETY NETWORK

RELATED APPLICATION

This application is a continuation-in-part of application Ser. No. 15/996,376, filed Jun. 1, 2018, entitled PERSONAL SAFETY NETWORK, which is hereby incorporated by reference.

BACKGROUND OF THE INVENTION

Field of the Invention

The present invention relates generally to the field of personal communications and, more specifically, to a personal safety network through which groups of individuals may rapidly communicate and share information regarding an emergency or other circumstance.

Background Information

When an incident occurs at a school, business, or other facility that affects or may affect the safety of the people at the facility, there is a need for rapid communication. For example, a student sees someone in the school, or heading towards the school, and the student is concerned. The student may not know the person, and believes the person doesn't belong in the school, or perhaps the student knows the person, and feels threatened. The student needs to be able to report this situation to someone who can do something rapidly. Calling 911 may seem like an overreaction, and finding the appropriate person on a campus may take too much time. Ideally, the student should be in contact with a trusted individual, and quickly receive a response that indicates that there is no actual threat, or that there is a threat and instructions about what to do.

Similarly, a student may observe someone in the school, or heading towards the school, who is carrying a weapon of some kind, or the student sees a fire or hears an explosion. The student needs to be able to report this circumstance immediately, and may need to let everyone in the school know what is happening, and where. Other students, as well as staff or faculty, may want to add information regarding what they see and hear. School administration or security personnel may wish to send instructions to all students. A common theme in this type of scenario is that there is chaos, and limited or inaccurate information. Instead of knowing there are shots fired in a particular part of a large building or multi-building campus, many people may be completely unaware that something is happening. Further, loud sounds generated by fire alarms or other emergency alarms may interfere with intercoms and public address systems, thus blocking effective communication through those channels.

SUMMARY OF THE INVENTION

In accordance with one aspect of the invention, a personal safety network (PSN) is provided in which authorized participants of the network may communicate with each other regarding threats, emergencies, or other circumstances. The PSN typically includes mobile, wireless communication devices such as smartphones, an administrative server, and a push notification server. The mobile devices, administrative server, and push notification server cooperate to enable distribution of virtually real-time, multi-way messaging among at least a predetermined group of authorized participants of the PSN which is selected by an originator of a message. The rapidity and efficiency of this communication, along with the ability for multiple authorized participants of the PSN to share their respective observations, warnings, and other information about an unfolding event, is highly advantageous.

Each mobile device of the PSN runs a mobile application which enables an authorized member to originate (compose) messages, and select an individual authorized participant of the PSN, a predetermined group of authorized participants, or all of the authorized participants to receive a given message. Messages are transmitted by the mobile device to the administrative server or, alternatively, to a push notification server with which the (client) mobile device is registered. For enhanced security, messages may be encrypted by the mobile application prior to transmission.

An administrative application, running on the administrative server, maintains records and data structures regarding mobile device registrations, authorized participants of the network and their respective PSN permissions, and predetermined groups of authorized participants which are defined by authorized participants. The administrative application may also receive messages originating from registered mobile devices. Upon receipt of a message, the administrative server stores a copy of the message in a message archive. The administrative server decrypts the initial message, if necessary for storage, and converts it into a push notification distribution. The push notification distribution includes both the content of the initial message and information necessary to effect distribution of the message to each of the authorized participants of the predetermined group designated by the authorized participant who originated the initial message. In response to receiving a push notification distribution from the administrative server, the push notification server, based on information contained in the push notification distribution, proceeds to push notifications to the mobile devices associated with the predetermined group of other authorized participants. A push notification server may also push notifications to mobile devices associated with authorized participants in response to a message received directly from a mobile device which previously registered with the push notification server. Each mobile device's mobile application, if necessary, decrypts the received push notification and displays it.

An authorized participant receiving a push notification based on an initial message may, in turn, originate a response message which, similar to the process summarized above, is sent to all of the other authorized participants who are members of the predetermined group which received the initial message. Alternatively, an authorized participant may send a response message only to the mobile device which originated the initial message. As an additional alternative, an authorized participant may send a response message to all authorized participants of the PSN.

In accordance with another aspect of the invention, beginning with an initial message, and continuing with any response message(s) received, the mobile device may display all such messages in a reverse chronological, continuing conversation format. This capability advantageously enables multiple authorized participants to coherently share their respective observations, warnings, or other information regarding a rapidly evolving event.

Further enhancing the usefulness of the message-based communications provided by the PSN, each displayed message may include an individual or group name, or other identifier of the authorized participant who originated the message, a time stamp, the text of the message, information regarding a geographic location of a mobile device at the time when a message was originated from that device, or other information.

In accordance with another aspect of the invention, permission to establish or modify the membership of predetermined groups of authorized participants may be assigned as part of PSN permissions. For example, any authorized participant of the PSN may have permission to request to join to an existing group, but such a request must be approved by an authorized participant having permission to modify the membership of that group.

In accordance with another aspect of the invention, the mobile application may query or poll the administrative server to check for a missed message. By comparing a message identifier of the last message received by the mobile application to the administrative server's stored messages, the administrative application may determine whether the mobile application failed to receive a previously sent message. If so, the administrative application will respond to the mobile application with the missing message(s). Polling for missed messages serves as a form of redundancy or safeguard since push notifications do not typically include an acknowledgement of successful reception by the intended recipient.

In accordance with another aspect of the invention, a first PSN may be linked to a second (or greater) PSN. Through such linking, a universe of authorized members may be expanded to cover larger geographical areas, or commonly owned or administered facilities that are remote from each other. For example, a school district may choose to implement a PSN for each individual school, which may be administered by a staff person who is familiar with that school's students, parents, staff, and faculty. The school district may choose to link all of the individual schools' PSNs together to enable district wide message broadcasting. Similar to an authorized participant requesting to join an existing group, an authorized participant of a first PSN having the necessary permission may transmit a request to link to a second PSN. Once the request is granted, the first and second PSNs are linked.

In accordance with another aspect of the invention, an enhanced PSN is arranged to receive notifications from security devices, convert such notifications to human-readable messages, and distribute the messages to selected PSN participants through virtually real-time, multi-way messaging. The enhanced PSN may also include a location data database for maintaining virtually real-time location information for PSN participants.

In accordance with another aspect of the invention, speech recognition is provided to enable PSN participants to dictate messages, which are converted to text-based messages before distribution through virtually real-time, multi-way messaging.

In accordance with another aspect of the invention, a system administrator may provide temporary access to first responders or other authorized entities to message threads and underlying messages.

In accordance with another aspect of the invention, a PSN is arranged to receive notifications from a variety of devices which identify locations of PSN participants, and use such notifications to update the location data database as well as generate a facility-wide room status/user location page, and specific room status pages.

In accordance with another aspect of the invention, the PSN administrative application pre-processes and de-duplicates messages originating from PSN participants.

BRIEF DESCRIPTION OF THE DRAWINGS

The invention description below refers to the accompanying drawings, of which:

FIG. 4D is a representation of a manage group page generated by the PSN administrative application shown in FIG. 2;

FIG. 4E is a representation of a roles/permissions page generated by the PSN administrative application shown in FIG. 2;

FIG. 4F is a representation of an archive messages page generated by the PSN administrative application shown in FIG. 2;

FIG. 14 is a representation of a notifications settings page through which various groups of PSN users are authorized to receive messages originating from one or more security devices;

FIG. 18A is a representation of a message thread page, generated by the PSN administrative application shown in FIG. 2, which is temporarily available by first responders or other authorized entities;

FIG. 18B is a representation of a messages page accessible through the temporary access message thread page of FIG. 18A;

DETAILED DESCRIPTION OF ILLUSTRATIVE EMBODIMENTS

Figure 1:
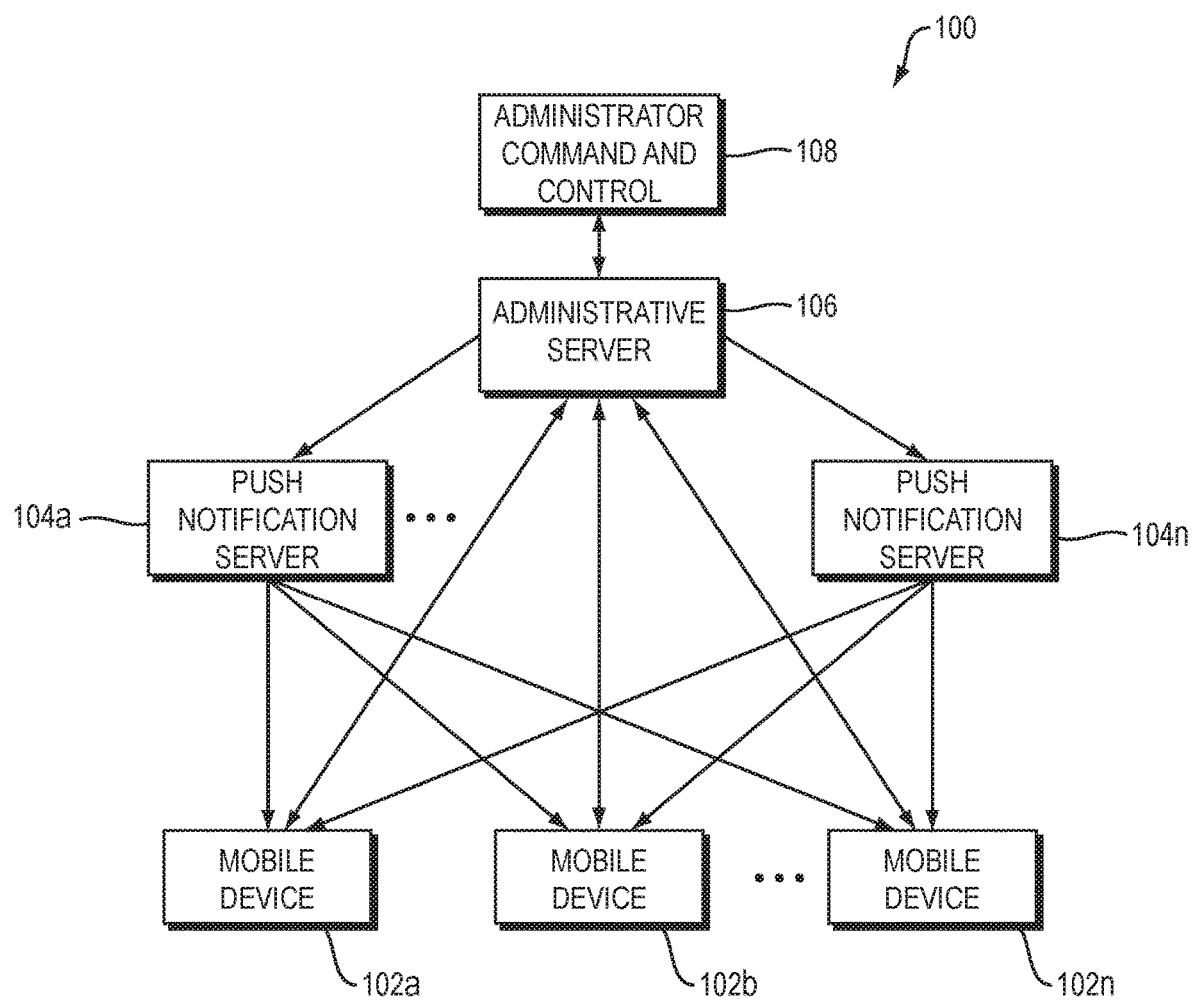
FIG. 1 is a block diagram of a personal safety network (PSN) in accordance with one aspect of the present invention.

FIG. 1 shows a block diagram of a personal safety network (PSN) 100 which includes mobile devices 102a, 102b . . . 102n, push notification servers 104a . . . 104n, an administrative server 106, and an administrator command and control unit 108. Each of mobile devices 102a . . . 102n may be based on a smartphone or other wireless communication device which is capable of sending text messages and receiving push notifications. Each of push notification servers 104a . . . 104n may be based on hardware and software available from a wide variety of commercial sources. Alternatively, one or more of push notification servers 104a . . . 104n may represent a third party owned or operated server which is compatible with iOS®, Android® or another operating system which is in use among mobile devices 102a . . . 102n. Administrative server 106 and administrator command and control unit 108 may be based on hardware and software available from a wide variety of commercial sources.

In general, each of mobile devices 102a . . . 102n is associated with an authorized participant (not shown) of PSN 100. As described in more detail below, each of mobile devices 102a . . . 102n runs a mobile application (not shown) which enables the devices to register with administrative server 106. Alternatively, mobile devices 102a . . . 102n may use the mobile application to register with one or more of push notification servers 104a . . . 104n by presenting a unique device ID along with UserID, GroupID, and SubGroupID tags.

Once registered, each mobile device 102a . . . 102n may transmit messages, each of which is addressed to an individual authorized participant of PSN 100, a predetermined group of authorized participants of PSN 100, or all authorized participants of PSN 100, to administrative server 106 which is running an administrative application (not shown). In turn, administrative server 106, in cooperation with push notification servers 104a . . . 104n, functions to distribute each message to the members of the predetermined group of authorized participants to which it is addressed, effectively enabling virtually real-time, multi-way messages among such authorized participants.

Alternatively, mobile devices 102a . . . 102 which registered with one or more of push notification servers 104a . . . 104n may transmit messages directly to those servers. Again, each message may be addressed to an individual authorized participant of PSN 100, a predetermined group of authorized participants of PSN 100, or all authorized participants of PSN 100.

Figure 2:
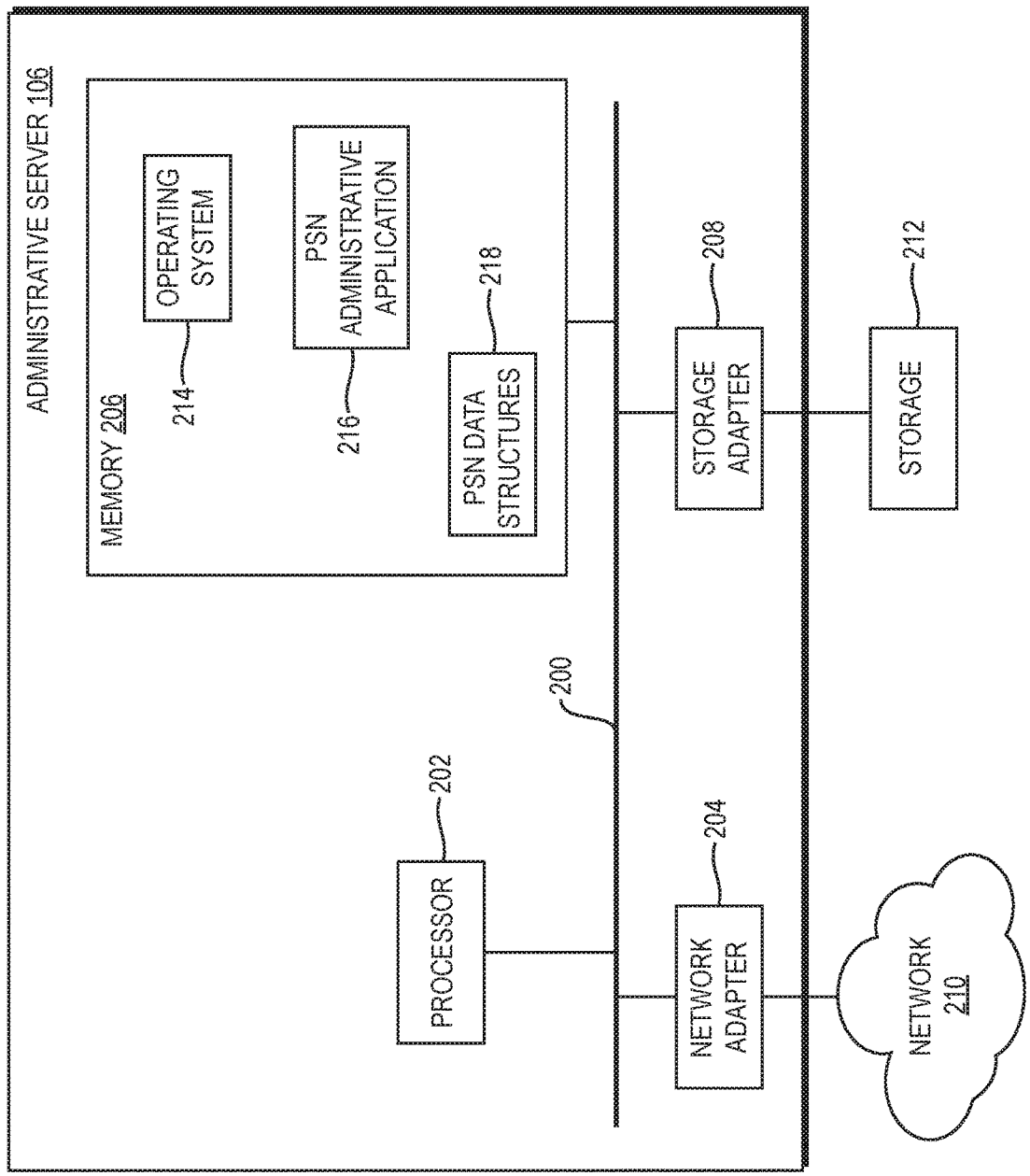
FIG. 2 is a block diagram of the administrative server shown in FIG. 1.

FIG. 2 is a block diagram of administrative server 106 shown in FIG. 1. For enhanced clarity and conciseness, an element introduced in a previous figure retains the same reference number throughout this specification. Administrative server 106 includes a bus 200 which interconnects a processor 202, a network adapter 204, a memory 206, and a storage adapter 208. Network adapter 204 interfaces with network 210 which may represent the Internet or another public or private network. Storage adapter 208 interfaces with storage 212 which may represent disk, flash memory, or other mass storage media. Memory 206 includes an operating system 214, a PSN administrative application 216, and PSN data structures 218.

Figure 3:
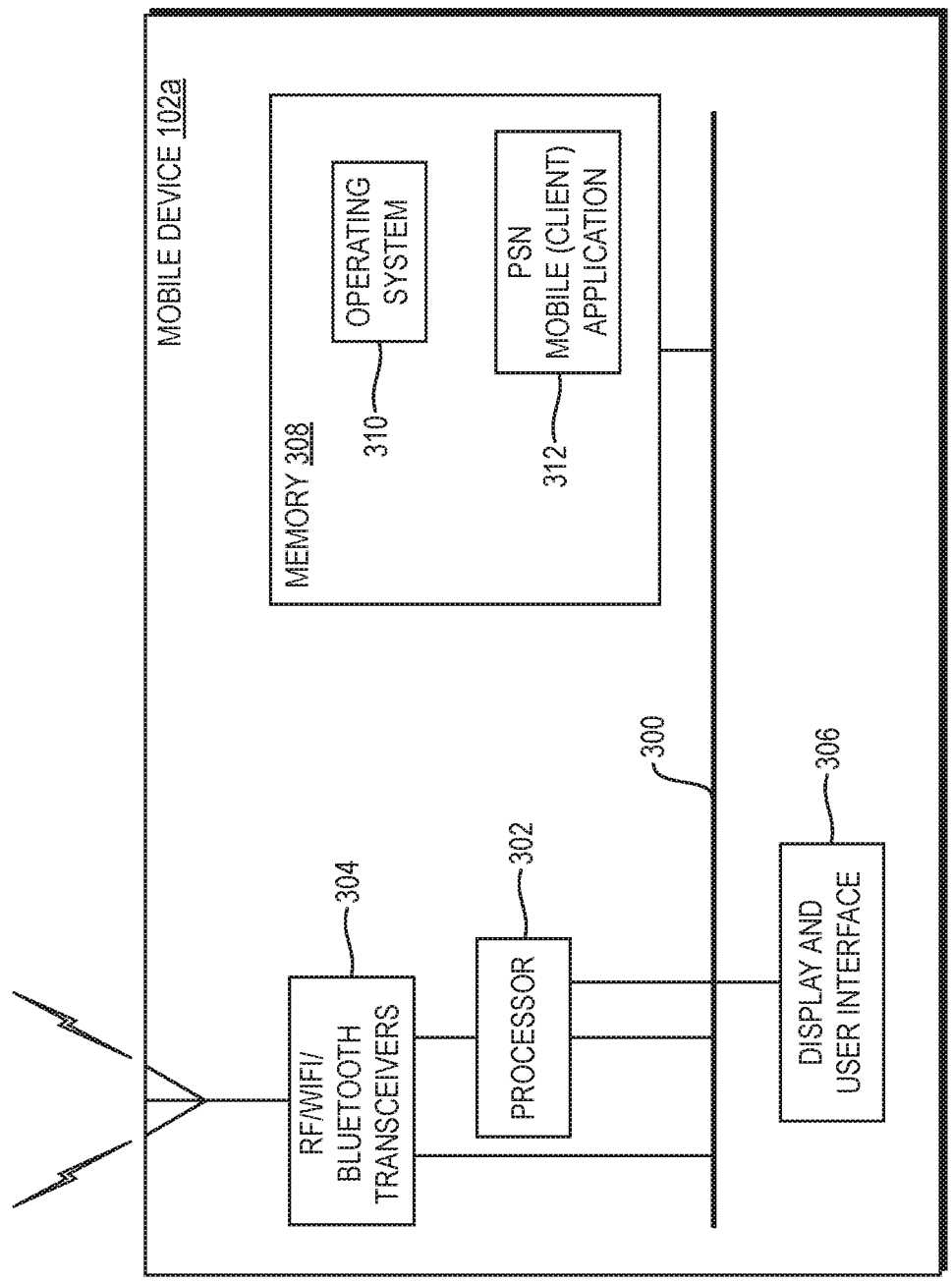
FIG. 3 is a block diagram of a representative one of the mobile devices shown in FIG. 1.

FIG. 3 is a block diagram of mobile device 102a shown in FIG. 1. Mobile device 102a includes a bus 300 which interconnects a processor 302, RF/WiFi™/Bluetooth® transceivers 304, a display and user interface 306, and a memory 308. Memory 308 includes an operating system 310 and a PSN mobile (client) application 312. Operating system 310 may represent iOS®, Android® or another commercially available operating system. PSN mobile application 312 may be downloaded and installed from third party application stores, such as those owned or operated by Apple Inc. or Google, or other websites.

Figure 4A:
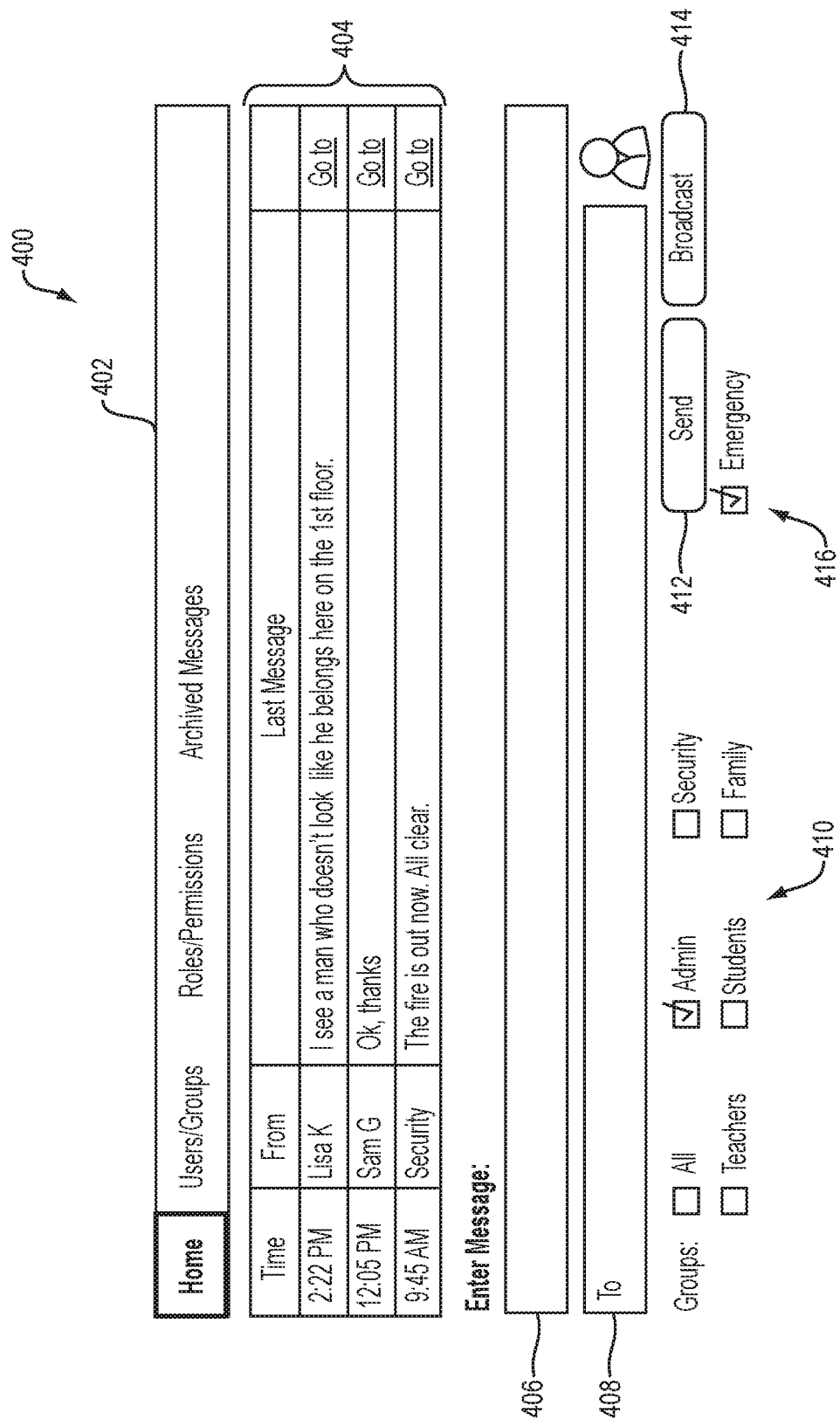
FIG. 4A is a representation of a home page generated by the PSN administrative application shown in FIG. 2.

FIGS. 4A-4F are representations of various pages generated by the PSN administrative application 216 shown in FIG. 2. Turning first to FIG. 4A, a representation of an administrative home page 400 is shown. A top level navigation menu 402 is displayed above a recent message threads list 404. Recent message threads list 404 displays, in reverse chronological order, a time stamp, message originator, and message text for the most recent message received by administrative application 216 for a given thread. By clicking a "Go to" link corresponding to a given thread displayed in recent message threads list 404, an administrator may view, and optionally contribute to, that thread as discussed below in connection with FIG. 4B. Throughout this specification, it should be understood that references to "pressing" or "tapping" buttons or "clicking" links are merely exemplary and that such terms include any action which results in actuation or activation of a control.

A new message box 406 is provided for an administrator (not shown) to compose new messages. An intended recipients box 408 is provided which enables an administrator to specify either an individual authorized member of PSN 100 or, using checkboxes 410, a predetermined group of authorized members, as the intended recipient(s) of the next message sent by the administrator. An emergency priority checkbox 416, if checked, specifies that the next message sent by the administrator has highest priority for delivery to the intended recipients. By tapping a send button 412, an administrator sends a new message (as it appears in new message box 406) to the intended recipient(s). By tapping a broadcast button 414, an administrator may send a new message to all authorized participants of PSN 100.

Figure 4B:
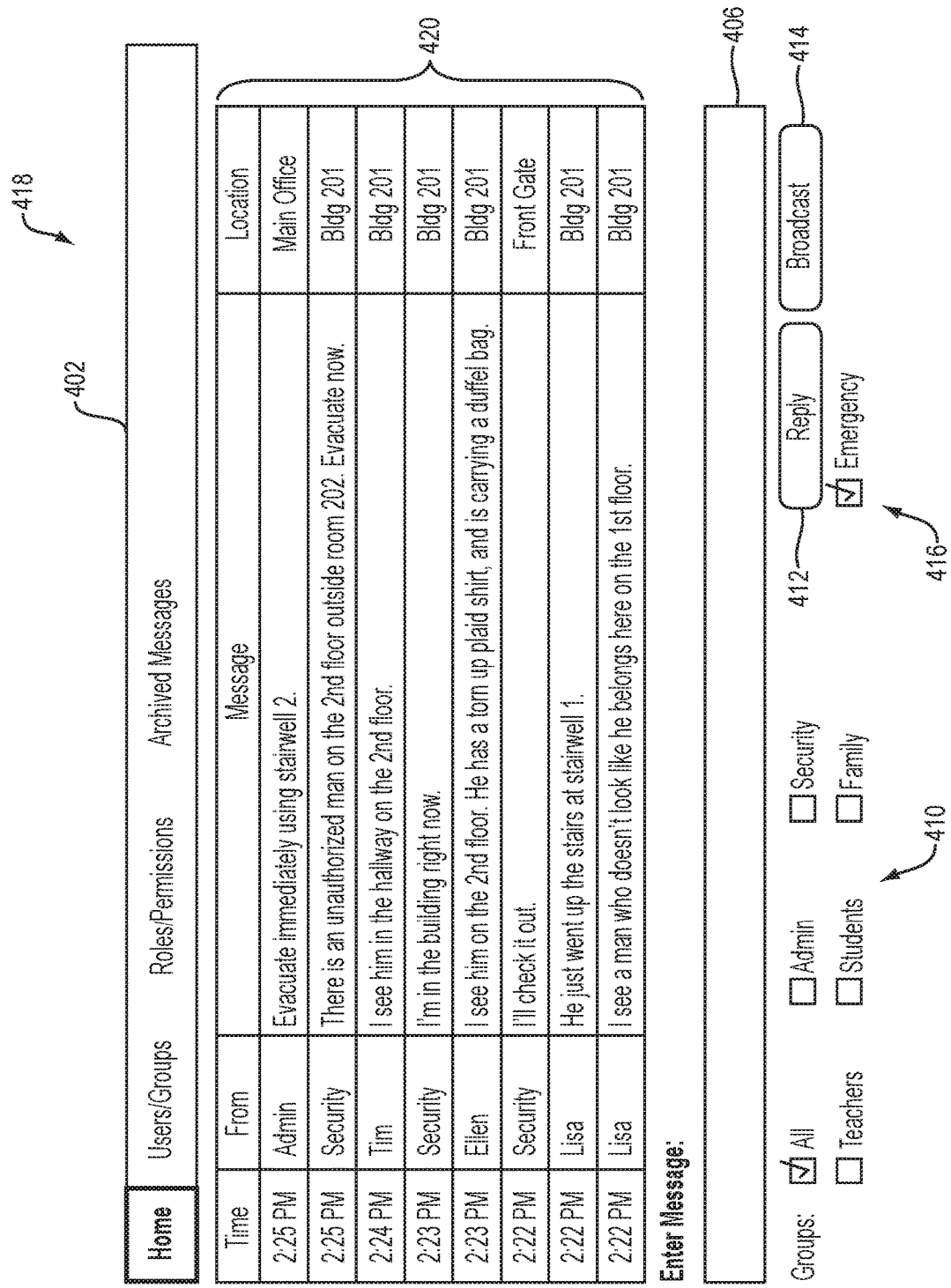
FIG. 4B is a representation of a message thread page generated by the PSN administrative application shown in FIG. 2.

Turning next to FIG. 4B, a representation of a message threads page 418 is shown. Most of the elements of message threads page 418 are common to administrative home page 400. However, a message list 420 displays, in reverse chronological order, a time stamp, message originator, message text, and message originator location for each message of the displayed thread. An administrator may use message threads page 418 to simply review what transpired or, alternatively, to compose and send a new message on the displayed thread.

Figure 4C:
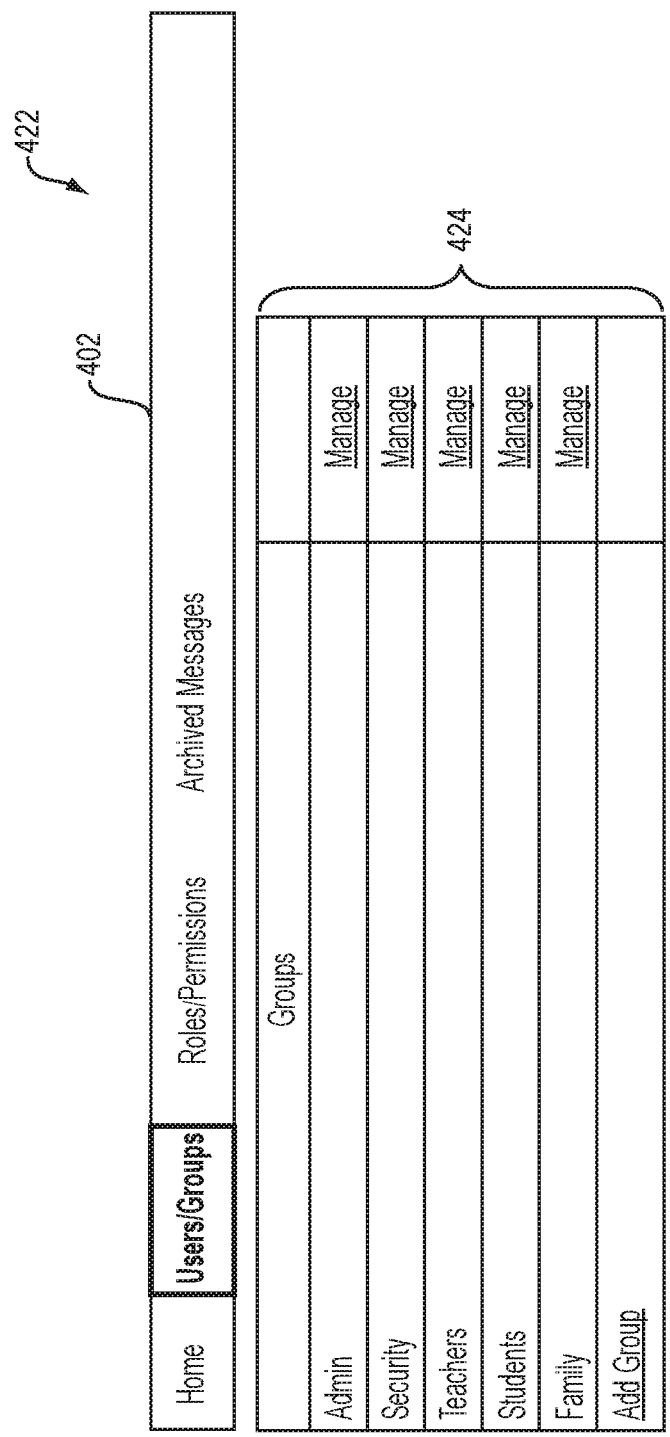
FIG. 4C is a representation of a users/groups page generated by the PSN administrative application shown in FIG. 2.

FIG. 4C is a representation of a users/groups page 422. A groups list 424 displays the names of previously defined groups of authorized participants of PSN 100. For example, a group named "Admin" may contain authorized participants of PSN 100 who hold administrator permissions. A group named "Security" may contain authorized participants of PSN 100 who are also security personnel. By clicking an "Add Group" link, an administrator may create a new group. By clicking a "Manage" link, an administrator may make changes to an existing group as shown in FIG. 4D.

FIG. 4D shows a representation of a manage group page 426 generated by the PSN administrative application 216 shown in FIG. 2. The manage group page 426 shows information for a group named "Family" as indicated by a group name box 428. A group role box 430 shows the role of this group is "Family". By tapping a "Save" button 432, an administrator may save any changes made to the displayed group. By tapping an "Import Users" button 434, an administrator may import additional authorized participants into the displayed group from a spreadsheet or other data source (not shown).

A group members (users) list 436 displays, for each group member, a name, a unique PSN identification number, an email address, and a phone number. Each entry on list 436 also includes an "Edit" link and a "Delete" link by which an administrator may, respectively, edit a group member's information or delete a member from the group.

A request to add new members (users) list 438 shows information on authorized participants of PSN 100 for whom a request for membership in the displayed "Family" group has been made. Specifically, a group member "Lisa K." who is an existing member of the displayed "Family" group has requested that a new member "Dan G.", who is identified as the father of "Lisa K.", be added to the "Family" group. An administrator may approve or disapprove the request by clicking on the corresponding button displayed at the right. Once a new group member is approved, he or she becomes an authorized participant of PSN 100.

FIG. 4E shows a representation of a roles/permissions page 440 generated by the PSN administrative application shown in FIG. 2. A roles list 442 contains the available choices for the role box 430 shown in FIG. 4D. That is, the roles shown in roles list 442 represent the available choices for the role to be assigned to a given group of authorized participants of PSN 100. Each role in roles list 442 includes a role name, and a series of check boxes which specify PSN 100 permissions associated with a given role. A new role may be added to roles list 442 by clicking an "Add" link. Changes to the indicated permissions of any roles on list 442 may be saved by clicking "Save" button 444.

FIG. 4F shows a representation of an archive messages page 446. Archive messages page 446 allows an administrator to view older messages (e.g., messages older than 24 hours) and to search by keyword using a search box 450. In addition, an administrator may filter the messages displayed in an archived message list 448 using a date filter 452 or a user filter 454 (or both). When an archived message of interest appears in archived message list 448, an administrator may click on a displayed "Go to" link and view a thread containing the message of interest as described above in connection with FIG. 4B.

Figure 4G:
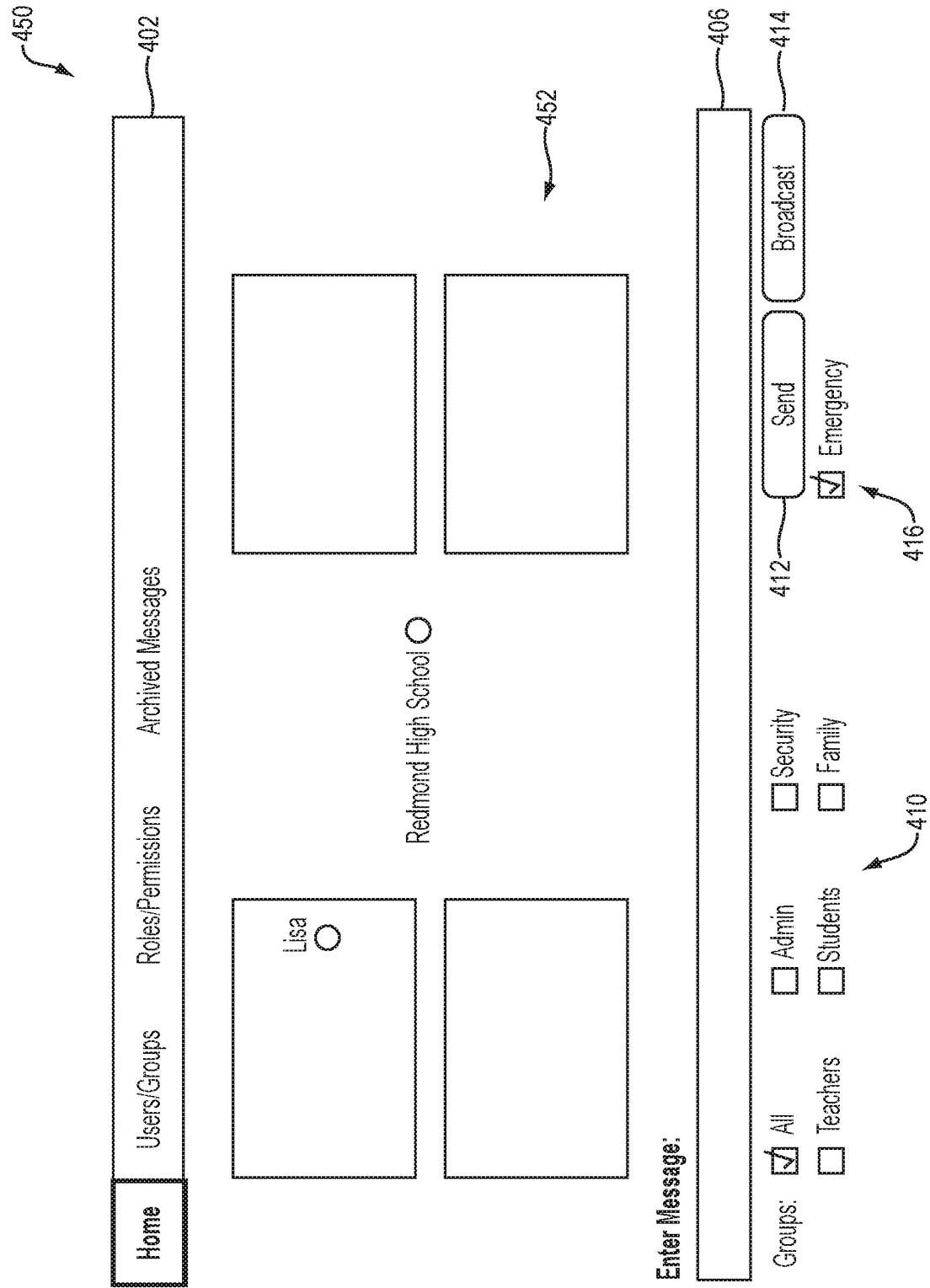
FIG. 4G is a representation of an authorized participant location page generated by the PSN administrative application shown in FIG. 2.

FIG. 4G shows a representation of an authorized participant location page 450. Using geographical location information which is appended to messages originated by PSN mobile application 312, as described below, PSN administrative application 216 shows the physical location of an authorized participant of PSN 100 as of the time that authorized participant sent a particular message.

Figure 5A:
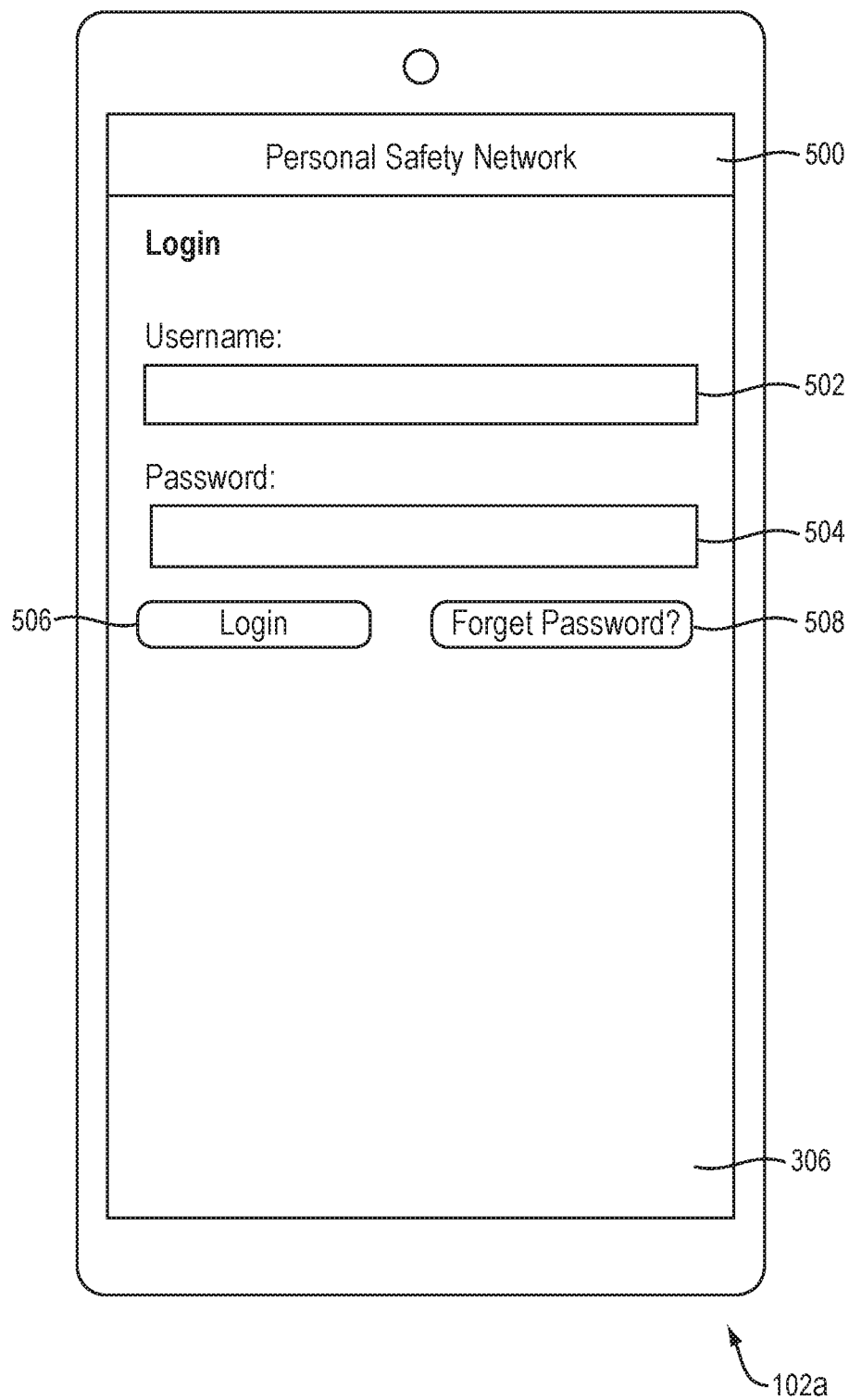
FIG. 5A is a representation of a login page generated by the PSN mobile application shown in FIG. 3.

FIGS. 5A-5E are representations of various pages generated by PSN mobile application 312 shown in FIG. 3. FIG. 5A shows a representation of a login page 500 as it may appear on display and user interface 306 of mobile device 102a. A username box 502 accepts typed entry of a username assigned to an authorized participant of PSN 100. Similarly, a password box 504 accepts typed entry of a password assigned to or selected by the authorized member. A newly authorized participant of PSN 100 may receive a username and initial password by email as part of the process described above in connection with FIG. 4D.

When pressed, a "Login" button 506 causes PSN mobile application 312 to contact administrative server 106 and present the entered username and password credentials for validation. As part of a successful initial login by a new authorized participant of PSN 100, the administrative server 106 may prompt the authorized participant to establish a new password. After a successful initial login, a "Forgot Password?" button may be pressed to recover an existing password or establish a new password.

Figure 5B:
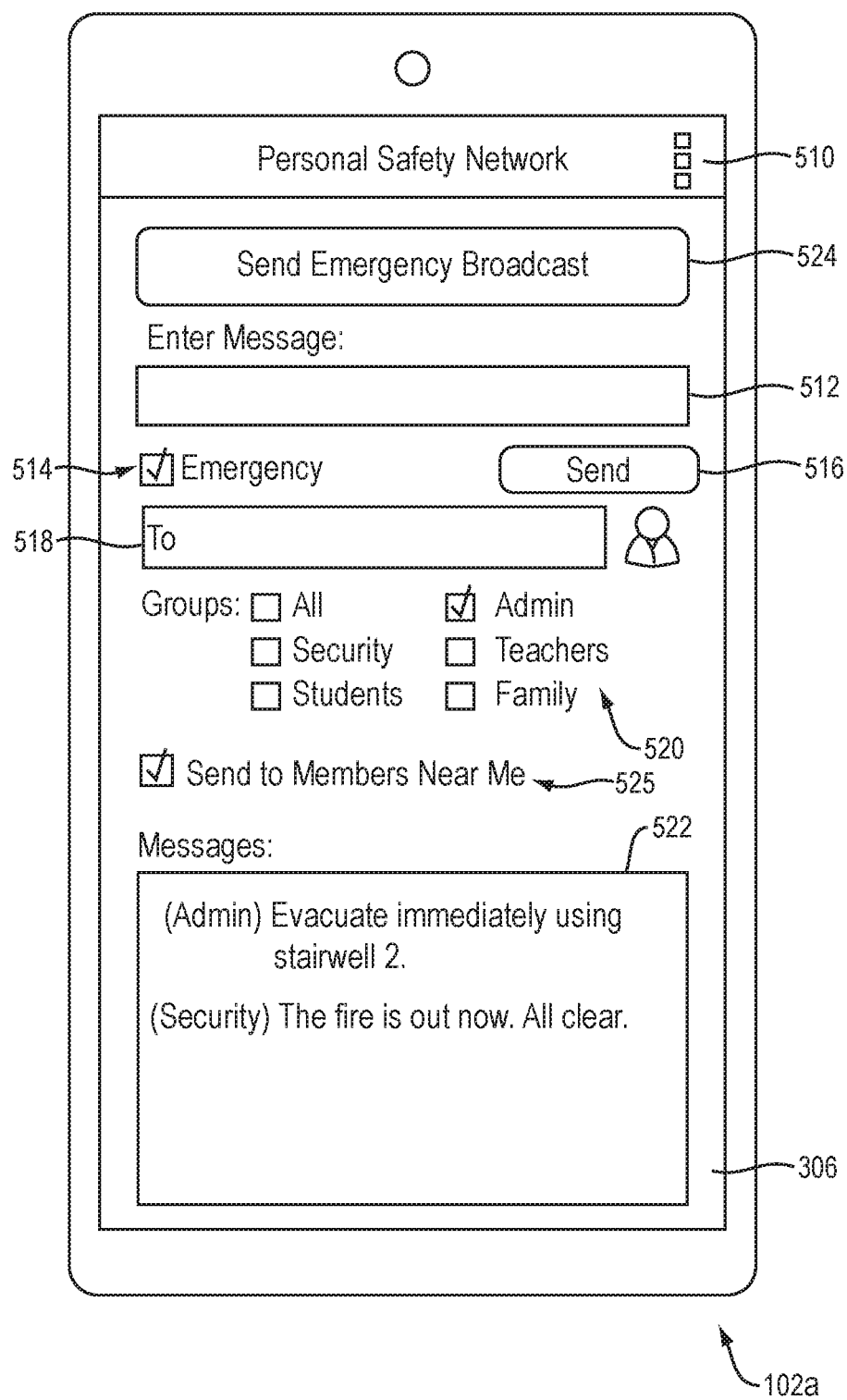
FIG. 5B is a representation of a home page generated by the PSN mobile application shown in FIG. 3.

Following a successful login, a mobile home page 510, as shown in FIG. 5B, may be displayed by display and user interface 306. Similar to administrative home page 400 discussed above, a new message box 512 is provided for an authorized participant (not shown) of PSN 100 to compose new messages. An intended recipients box 518 is provided which enables an authorized member to specify either another, individual authorized participant of PSN 100 or, using checkboxes 520, a predetermined group of authorized participants, as the intended recipient(s) of the next message sent. An emergency priority checkbox 514, if checked, specifies that the next message sent has highest priority for delivery to the intended recipients. In addition, without intervention by an authorized participant, PSN mobile application 312 may automatically append to each message a current latitude and longitude of the mobile device 102a . . . 102n originating the message. Leveraging such geographical information, a checkbox 525, when checked, enables an authorized participant of PSN 100 to send a message to other authorized participants of PSN 100 who are in close geographical proximity.

By pressing a "Send" button 516, an authorized participant of PSN 100 sends a new message (as composed in new message box 512) to the intended recipient(s) and starts a thread.

A received messages box 522 displays, in reverse chronological order, messages received through PSN 100 by PSN mobile application 312. As displayed, each received message includes a parenthetical (e.g., "(Admin)") advantageously showing the predetermined group from which the message originated. Knowledge of the source of a particular message may be of critical importance for a message recipient in determining what action, if any, to take.

In an emergency situation in which there may not be time, or it is unsafe, to compose a message, a "Send Emergency Broadcast" button 524 may be pressed. Such action will immediately broadcast an emergency message (i.e., a default message such as "An emergency is in progress") to all authorized participants of PSN 100. Pressing or otherwise activating either send button 516 or "Send Emergency Broadcast" button 524 will cause PSN mobile application 312 to transition to a mobile messages page 526 as shown in FIG. 5D discussed below.

Figure 5C:
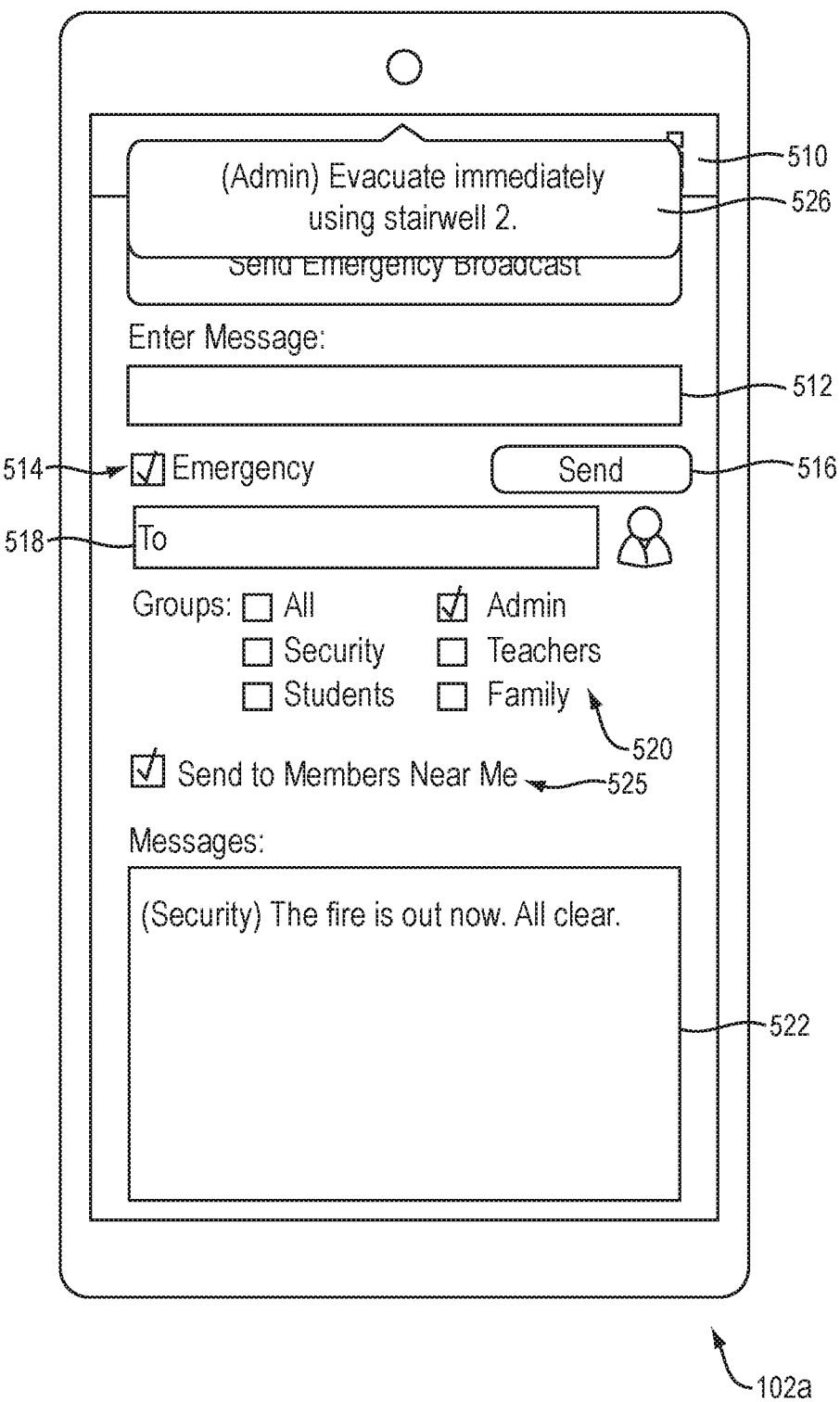
FIG. 5C is a representation of the home page shown in FIG. 5B following receipt of a message from a PSN administrator.

As shown in FIG. 5C, mobile home page 510 displays messages received by push notifications from PSN 100 (i.e., received from push notification servers 104a . . . 104n), as illustrated by push notification 526. All pages of PSN mobile application 312 will display received push notifications from PSN 100 when that application is open. Such push notifications will be received by mobile devices 102a . . . 102n even when PSN mobile application 312 is not open. Tapping push notification 526 will cause PSN mobile application 312 to open and transition to a mobile messages page 528 as shown in FIG. 5D.

Figure 5D:
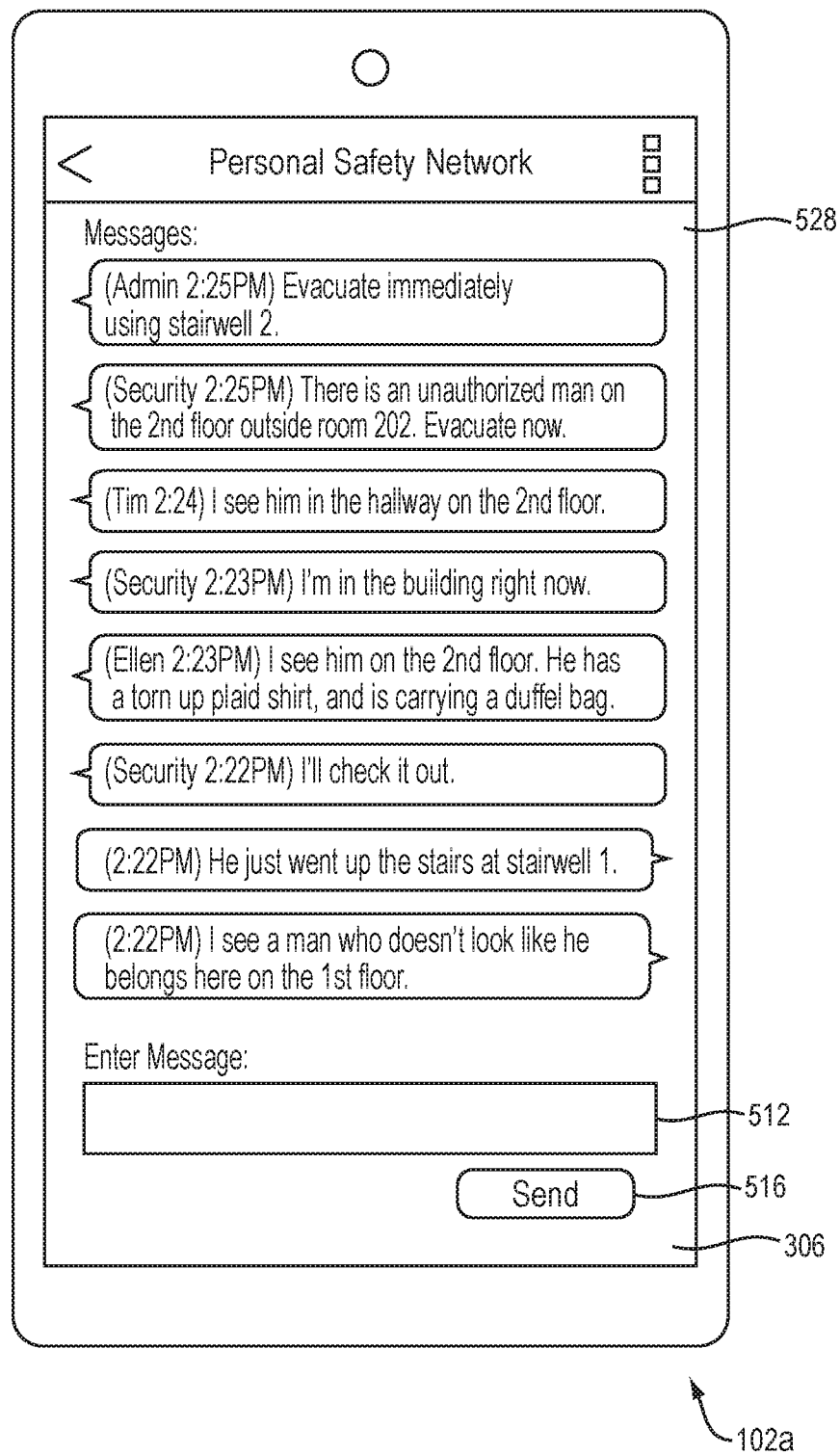
FIG. 5D is a representation of a messages page generated by the PSN mobile application shown in FIG. 3.

As shown in FIG. 5D, mobile messages page 528 displays the most recent messages of a thread in reverse chronological order. The displayed messages originated from any authorized participant of PSN 100 who is also a member of a predetermined group to whom an initial message was addressed, or any authorized participant of PSN 100 if the initial message was addressed to the group "All". New message box 512 may be used to compose a message which, when sent by pressing "Send" button 516, will be added to the thread.

As also shown in FIG. 5D, each displayed message includes a parenthetical advantageously showing the predetermined group or individual from which the message originated as well as a time stamp. In addition, the display of messages in a "chat" or continuing conversation format provides important information about how a situation is evolving in time, whether a threat is worsening or abating, when and where help should be expected to arrive, and the like. In this fashion, virtually real-time, multi-way messaging among at least the members of a predetermined group of authorized participants of PSN 100 is provided.

Figure 5E:
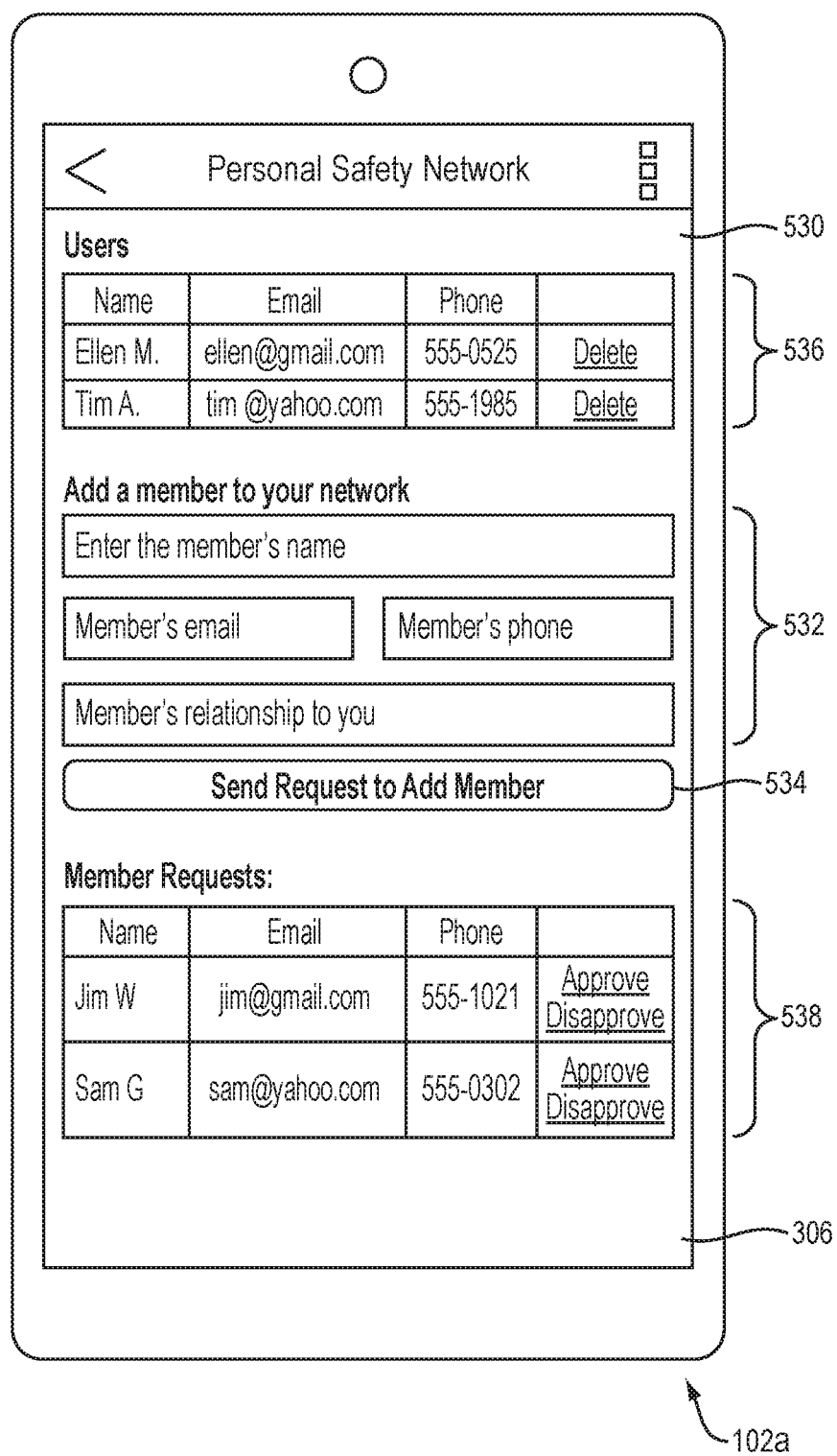
FIG. 5E is a representation of a users page generated by the PSN mobile application shown in FIG. 3.

FIG. 5E shows a mobile users page 530 which may be used to manage an authorized participant's PSN account. A family list 536 displays the current members (users) of a previously established "Family" group for a given authorized member. A potential new member of the "Family" group may be nominated by filling in the information required by boxes 532 (i.e., name, email address, phone number, and relation to person making nomination) and pressing a "Send Request to Add Member" button 534. That action will cause a request to be transmitted to both the "Family" group and the "Admin" group (FIG. 4D) for approval/disapproval. In FIG. 5E, two pending requests 538 to add new members are shown along with links to approve or disapprove. If members of the "Family" group have PSN permission to approve a new member, as shown in FIG. 4E, then they may do so. If not, a member of the "Admin" group must approve or disapprove the requests.

Figure 6:
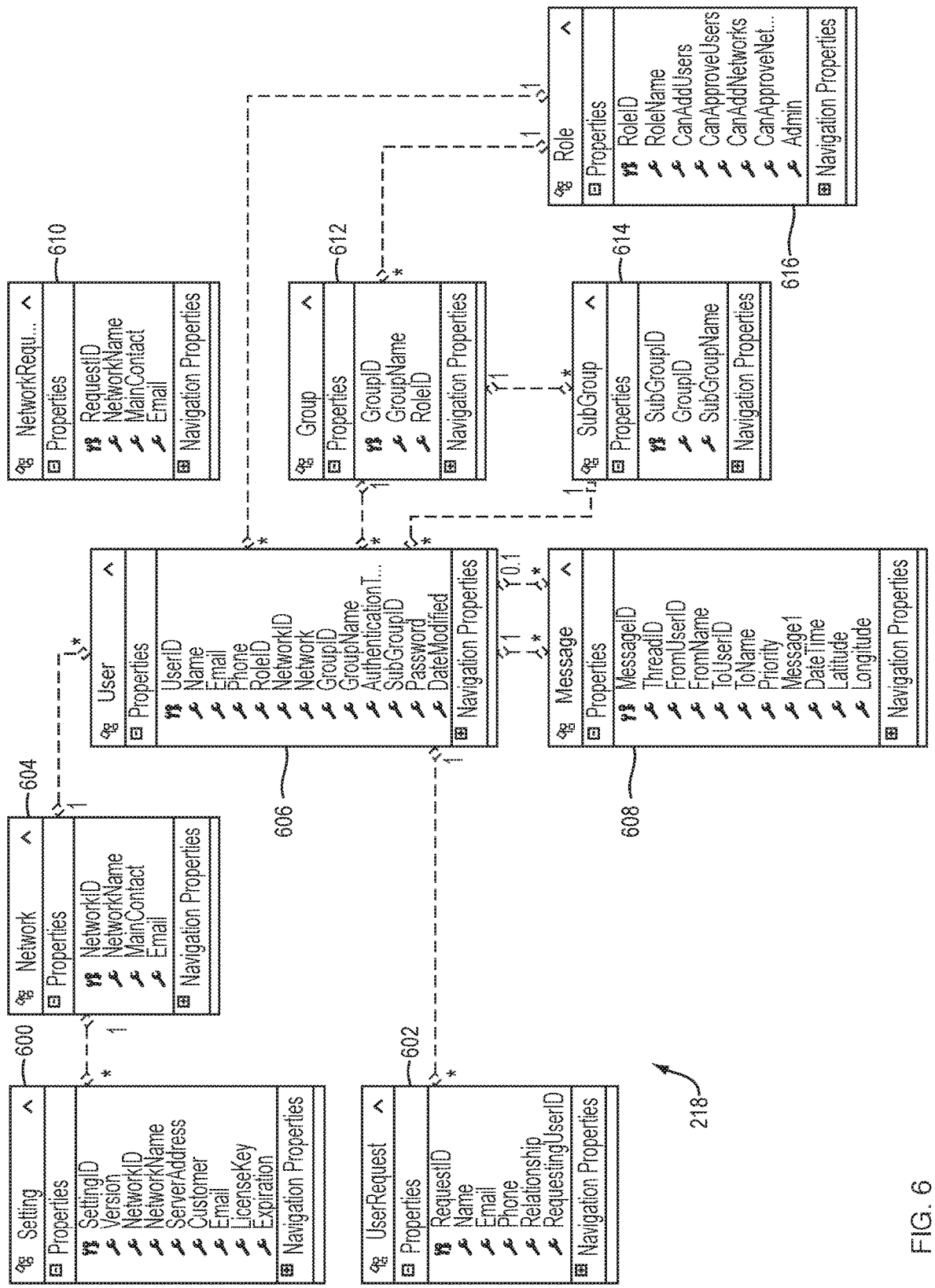
FIG. 6 illustrates examples of the PSN data structures shown in FIG. 2.
Figure 7A:
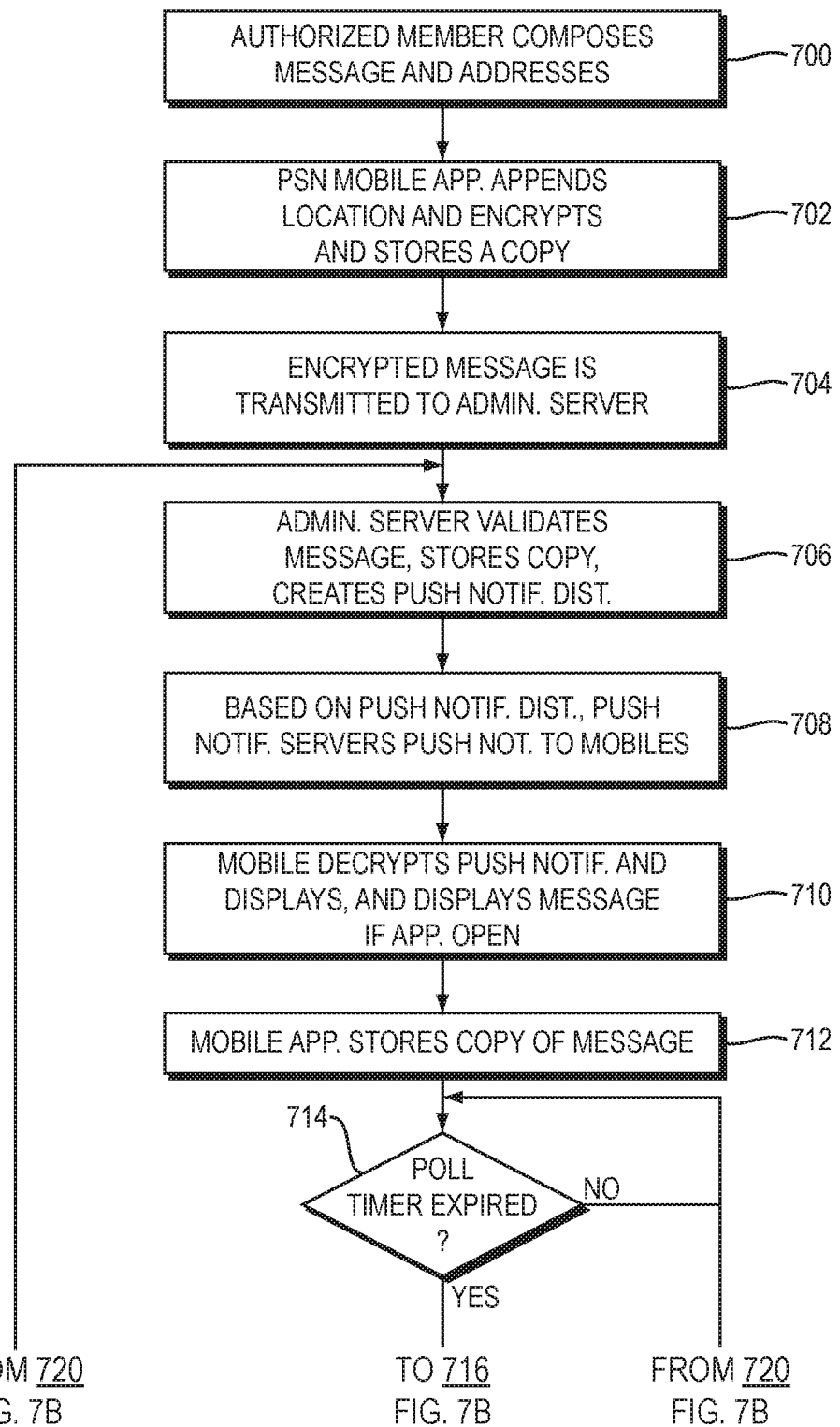
FIGS. 7A and 7B are a flowchart illustrating higher level interactions among components of the PSN shown in FIG. 1.
Figure 7B:
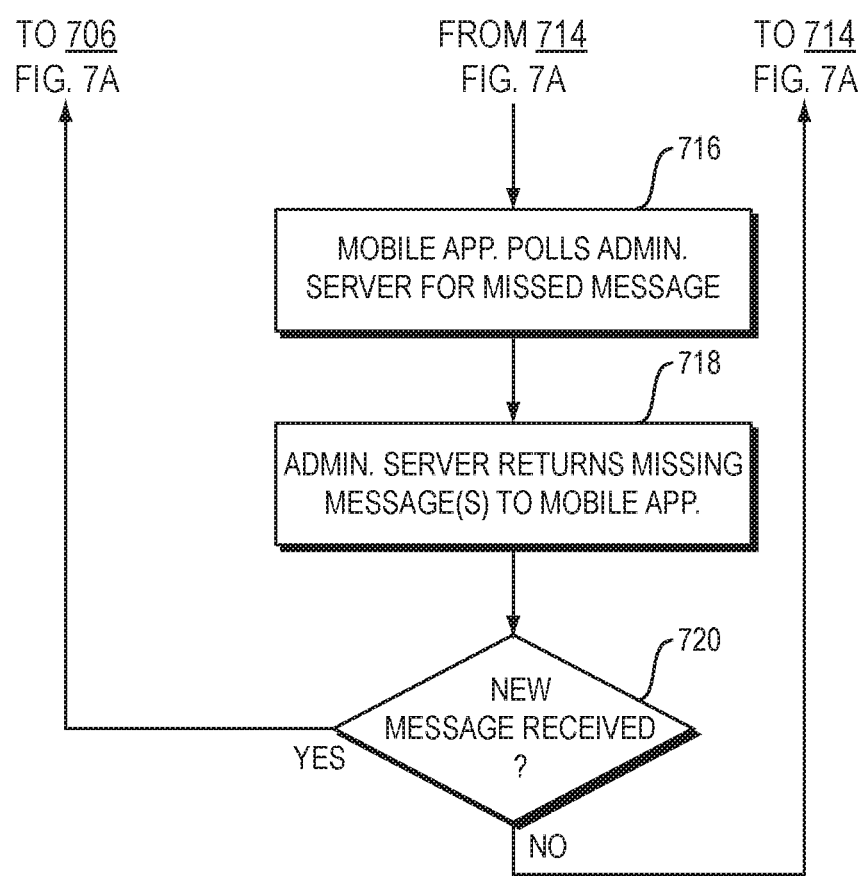

FIG. 6 shows examples of PSN data structures 218 (FIG. 2) used by PSN administrative application 216. A Setting object 600 and a Network table 604 together specify information needed to establish, operate and maintain PSN 100. A User table 606 corresponds with an authorized member (user) of the PSN 100. Properties of User table 606 include, inter alia, a user ID, name, email address, phone number, group name, and password. A Message object 608 corresponds with messages originated by an authorized member as described above. A Group table 612, Subgroup table 614, and Role table 616 together specify a given authorized member's group membership(s) and role(s) (i.e., PSN permissions).

A User Request object 602 corresponds with an authorized member's request to add another member to a particular established group as described above in connection with FIG. 5E.

A Network Request object 610 corresponds with a request to link two PSNs together as described below in connection with FIGS. 9-11.

With reference now to FIGS. 1-3, 7A and 7B, the higher level interactions among mobile devices 102a . . . 102n, administrative server 106, and push notification servers 104a . . . 104n are described. At step 700, an authorized participant of PSN 100, using PSN mobile application 312 running on one of mobile devices 102a . . . 102n, composes a message and addresses it to (a) another individual, authorized participant of PSN 100, (b) a predetermined group of authorized participants of PSN 100, or (c) to all authorized participants of PSN 100. Next, at step 702, PSN mobile application 312 appends location information (e.g., latitude and longitude) to the composed text, encrypts the entire message and stores a copy. At step 704, the encrypted message is transmitted to administrative server 106.

At step 706, administrative server 106 validates the received message, stores a copy in message archive, and creates a push notification distribution based on the authorized participants of PSN 100 to whom the validated message is addressed. The push notification distribution, which includes the encrypted message, is transmitted by administrative server 106 to push notification servers 104a . . . 104n. Next, at step 708, push notification servers 104a . . . 104n, using the push notification distribution, transmit push notifications, including the encrypted message, to the mobile devices 102a . . . 102n associated with the intended recipients of the message.

Each mobile device 102a . . . 102n which receives a push notification displays the notification even if PSN mobile application 312 is not open. If PSN mobile application 312 is open, the received, encrypted message is decrypted and also displayed. Next, at step 712, PSN mobile application stores a copy of the encrypted message.

PSN mobile application 312 includes a poll timer which is checked at step 714. If the poll timer has not yet expired, the process loops until expiration occurs. Expiration is followed by step 716 at which PSN mobile application 312 polls administrative server 106 to determine if application 312 failed to receive a previously transmitted message. This determination is done by PSN mobile application 312 transmitting a message ID (FIG. 6 at 608) of the most recent message it received. If administrative server 106 determines, based on that message ID, that there is a more recent message that was not received by PSN mobile application 312, the more recent message is returned to PSN mobile application 312 by PSN administrative server 106 at step 718.

As an alternative to the push notification approach described above, messages originated by authorized participants of PSN 100 may instead be distributed by a "pull" approach in which PSN mobile application 312 periodically polls administrative server 106. In this approach, PSN mobile application 312 periodically retrieves new messages from PSN administrative server 106 as opposed to polling for missed messages that were previously sent by push notifications.

At step 720, if a new message is received by administrative server 106, flow returns to step 706 for message validation. If no new message is received, flow returns to step 714.

Figure 8:
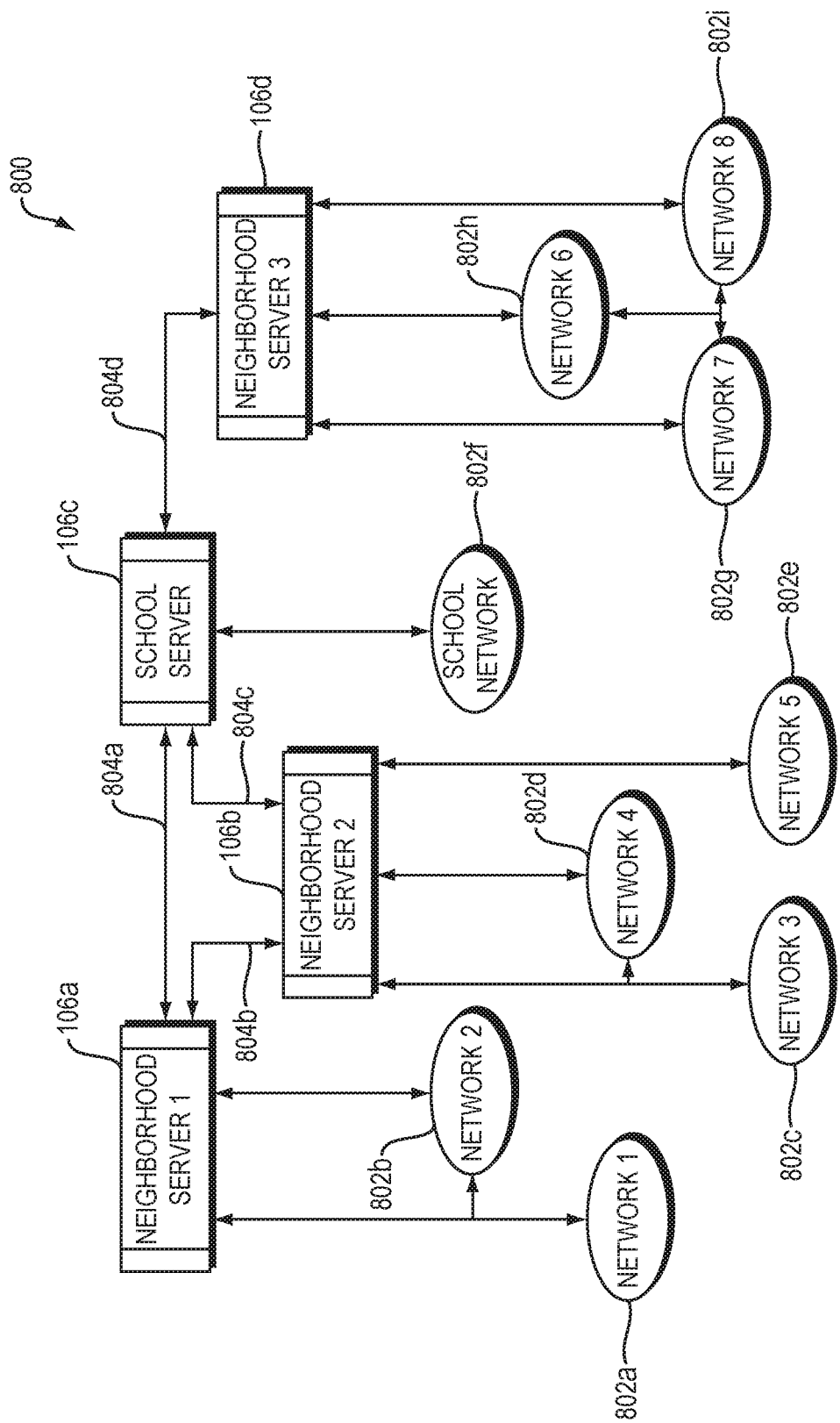
FIG. 8 is a schematic diagram showing a series of personal safety networks which have been linked together in accordance with one aspect of the invention.

As shown in FIG. 8, a linked PSNs environment 800 includes four administrative servers 106a, 106b, 106c, and 106d each of which includes functionality similar to administrative server 106 (FIG. 1). Administrative server 106a supports two personal safety networks 802a and 802b each of which provides functionality similar to that described above. For enhanced clarity, mobile devices and push notification servers have been omitted from FIG. 8. Each of administrative servers 106b, 106c, and 106d also supports multiple PSNs 802c . . . 802i.

As multiple PSNs are deployed across a given geographical area, school system, or commonly owned or controlled facilities, it may be desirable to link two or more PSNs together. For example, by linking multiple PSNs together, a larger number of authorized participants may be reached at once by a message addressed to "All" or an emergency broadcast message (FIG. 5B). This may be highly advantageous for dealing with threats or emergency situations affecting a wide geographic area as well as those where coordinated action among multiple organizations or facilities is needed.

As shown in FIG. 8, administrative server 106a has links 804a and 804b, respectively, to administrative server 106c and administrative server 106b. Through link 804a, PSNs 802a and 802b are effectively linked with PSN 802f. In order to establish a link between two PSNs, a request is made initially made by an authorized participant of one of the PSNs who has the necessary PSN permission.

Figure 9:
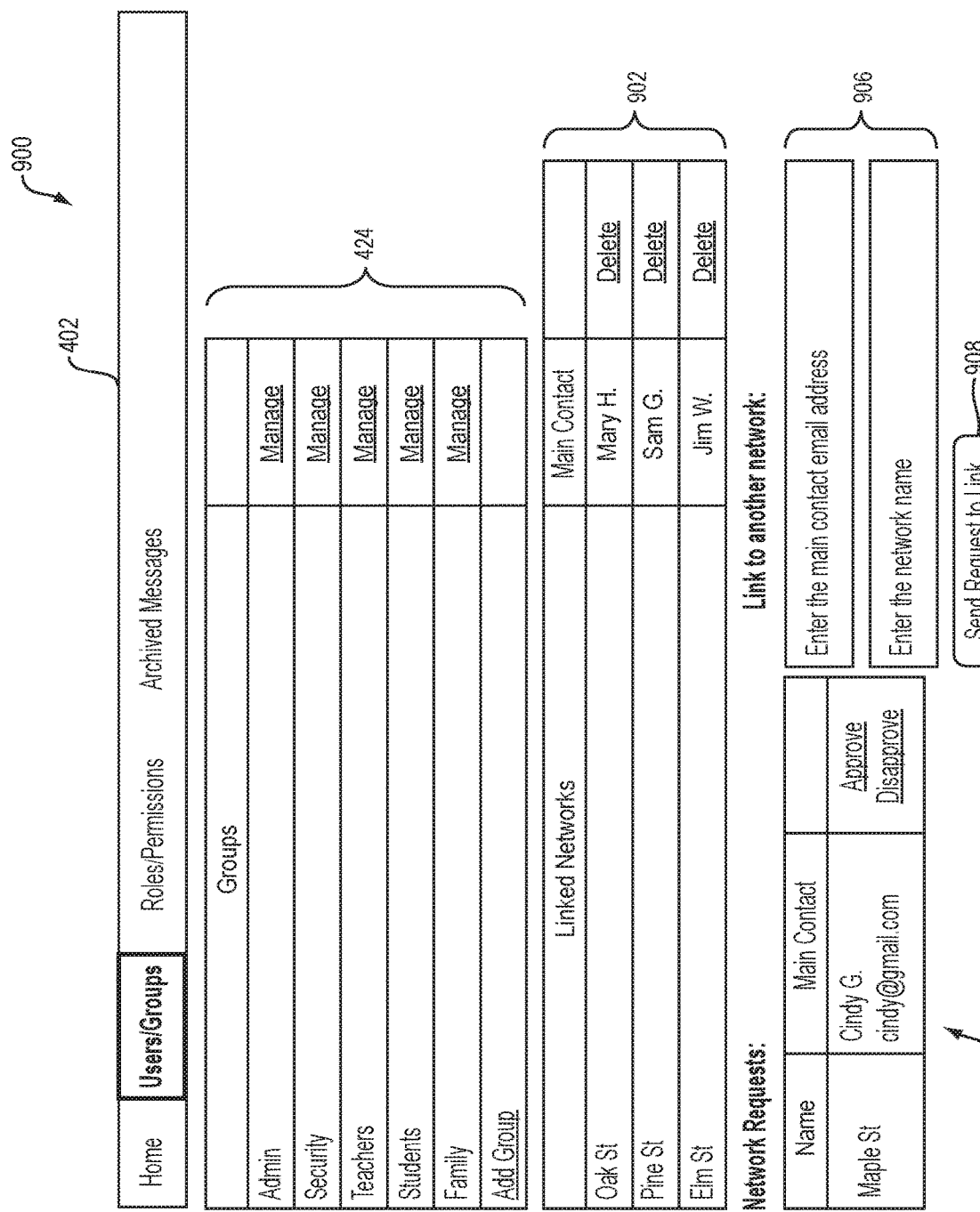
FIG. 9 is a representation of a users/groups page generated by the PSN administrative application shown in FIG. 2 which includes an ability to request to link one PSN with another PSN.

Referring now to FIG. 9, a users/groups page 900 of PSN administrative application 216 provides an administrator with the ability to both issue a request to link to another PSN as well as approve/disapprove similar requests received from other PSNs. A linked networks list 902 displays all currently linked PSNs including a main contact for each network. By clicking on a "Delete" link an administrator may sever the link to a particular. Also displayed is a pending request to link PSNs 904 which includes a network name, main contact, and links to approve/disapprove the request. Should an administrator which to make a request to link PSNs, he or she would fill in the information in boxes 906 (i.e., a PSN network name, a main contact name and email address), and press "Send Request to Link" button 908.

Figure 10:
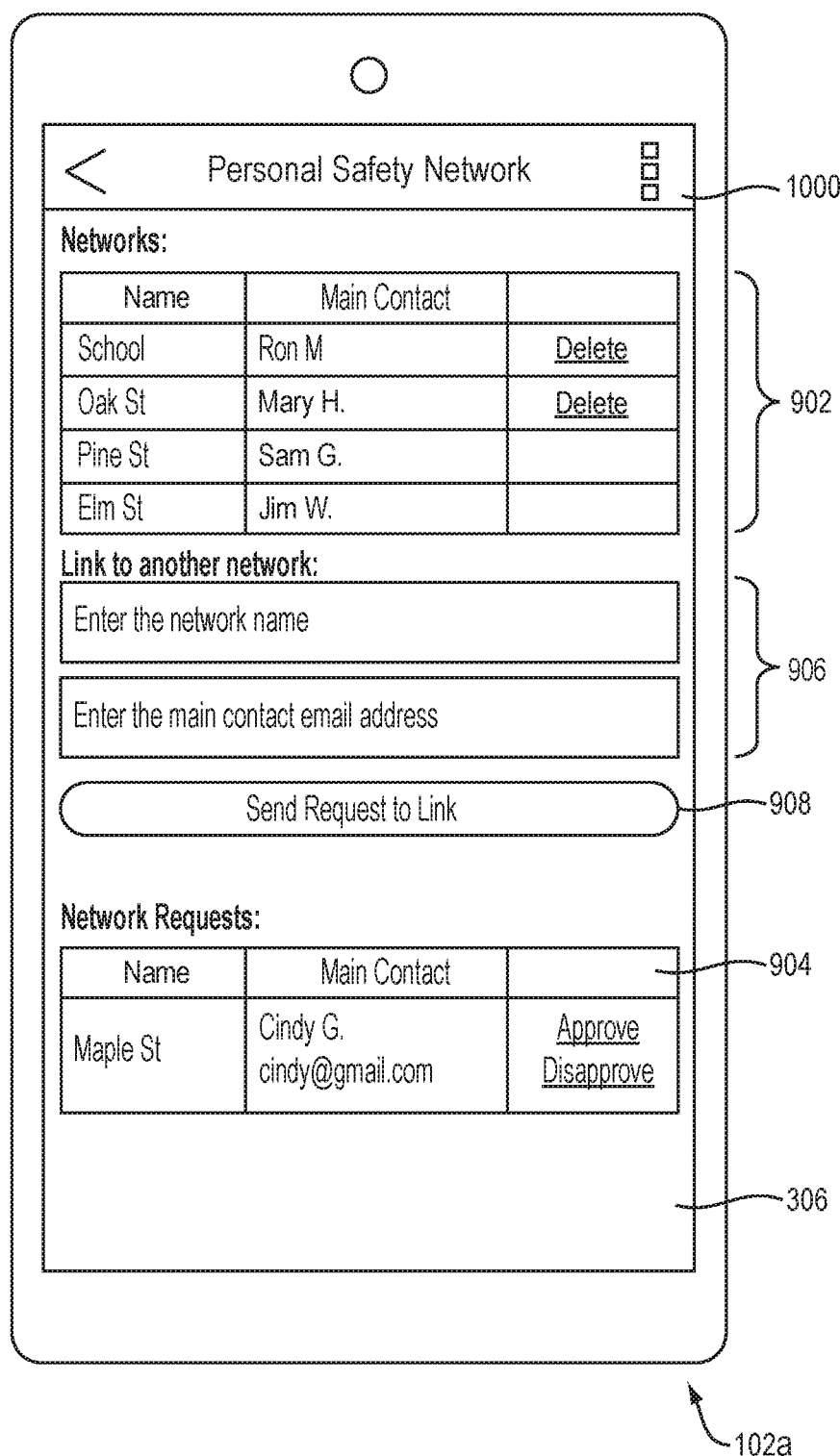
FIG. 10 is a representation of a networks page generated by the PSN mobile application shown in FIG. 3 which includes an ability to request to link one PSN with another PSN.

As shown in FIG. 10, functionality for requesting to link PSNs, and approving/disapproving requests, may also be provided in PSN mobile application 312. A PSN networks page 1000 displays information and controls similar to those shown in FIG. 9.

Figure 11:
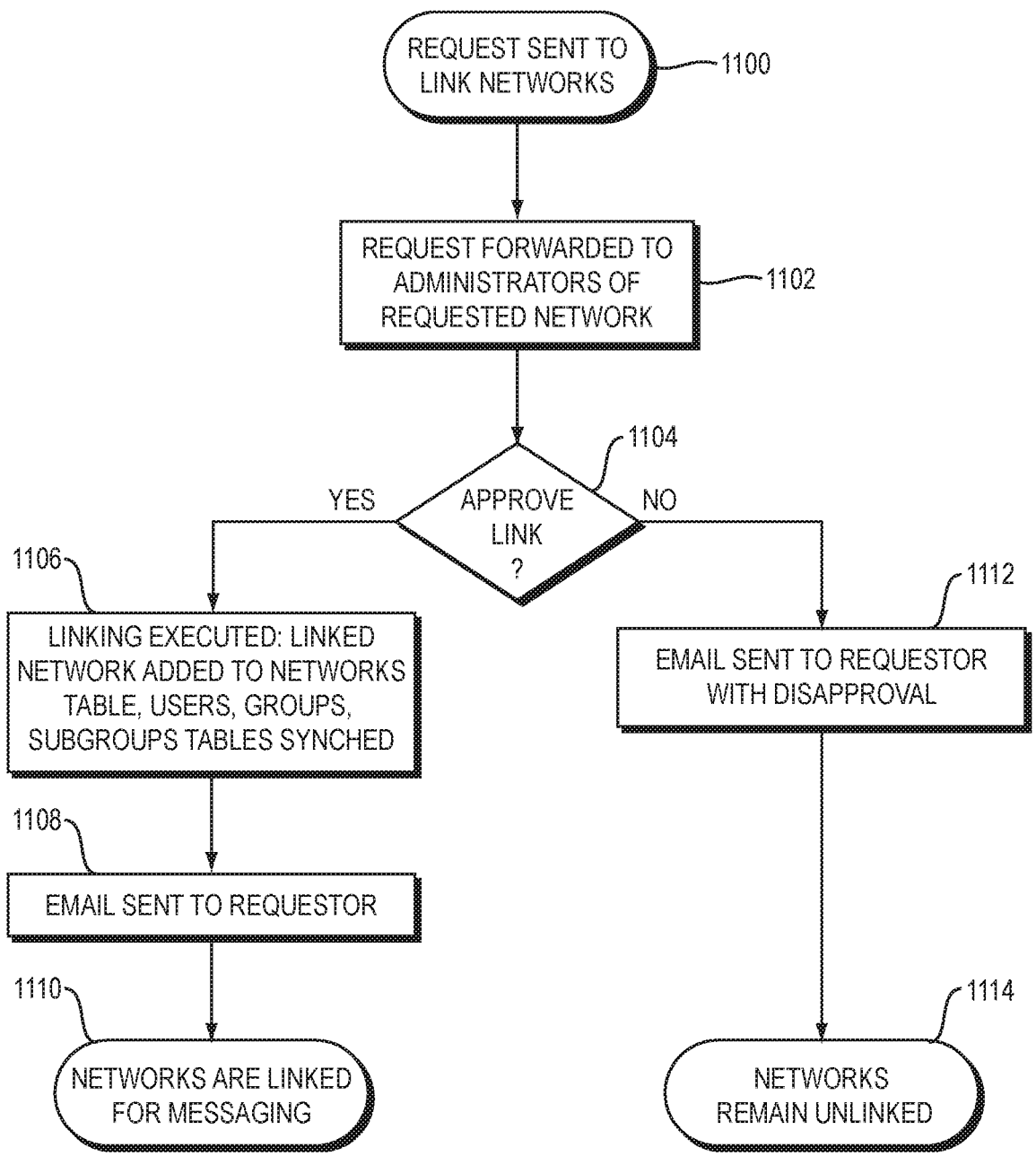
FIG. 11 is a flowchart illustrating higher level interactions with respect to a request to link one PSN to another PSN.

As shown in FIG. 11, at step 1100, a request to link PSNs is prepared as described above. The request is sent by email addressed or forwarded to an administrator (or other authorized member) of a PSN as shown in step 1102. The administrator who receives a request to link then approves or disapproves the request at step 1104. If the request is approved, at step 1106, each of PSN administrative applications 216 of the two linked networks adds the other network to its Network table 604, and synchronizes its User table 606, Group table 612, and Subgroup table 614. Next, at step 1108 an email is sent to the requestor confirming approval. As a result, at step 110, two PSN are now linked for messaging and each of PSN administrative applications 216 of the two linked networks recognizes all of the authorized participants of both of the linked networks. Alternatively, if the request to link is disapproved at step 1104, an email is sent to the requestor advising of disapproval at step 1112, and the two PSNs remain unlinked at step 1114.

Figure 12:
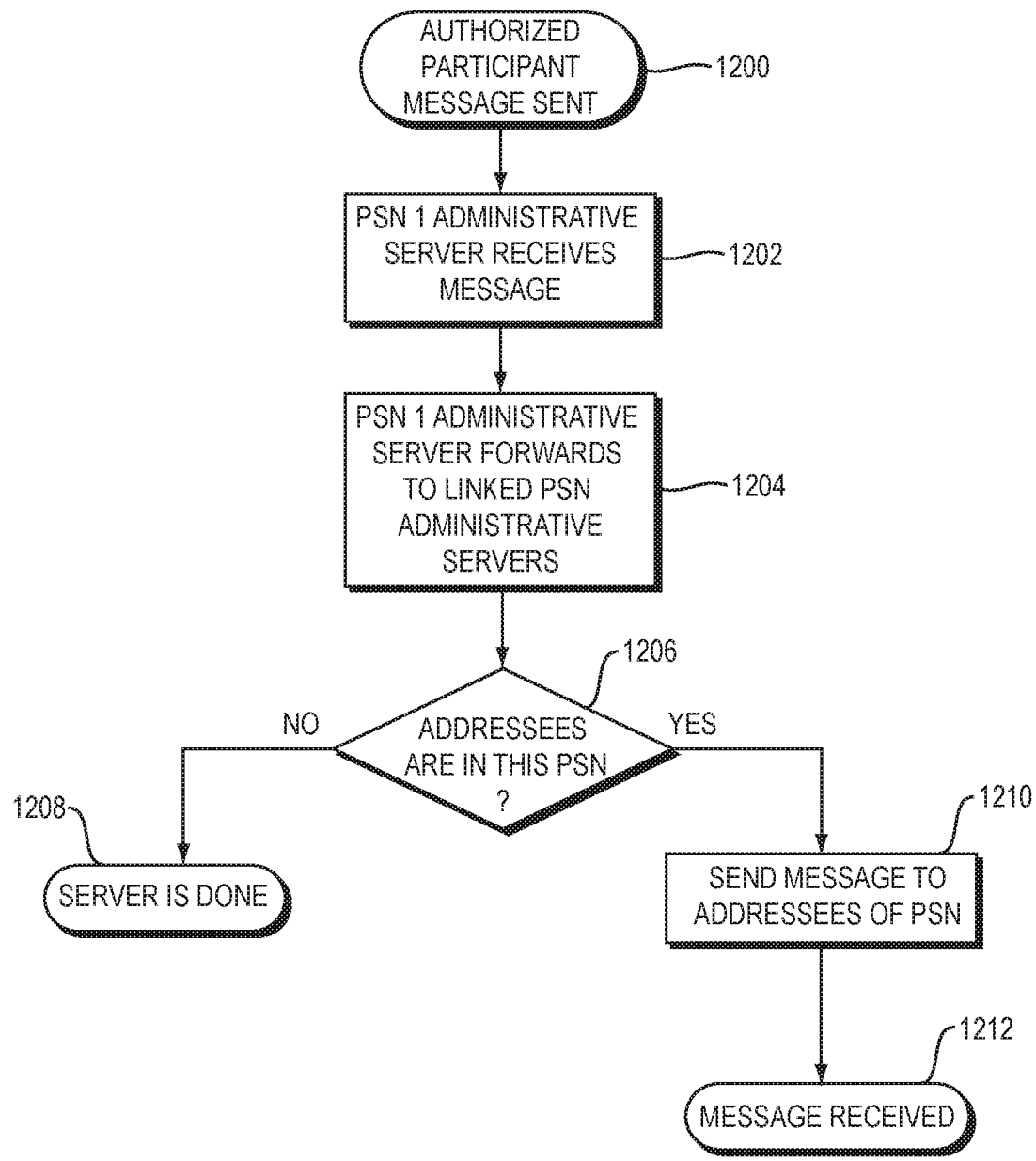
FIG. 12 is a flowchart illustrating how messages originated by authorized participants of a first PSN are delivered to authorized participants of other PSNs which are linked to the first PSN.

FIG. 12 is a flowchart illustrating how messages originated by authorized participants are delivered across linked PSNs. At step 1200, an authorized participant originates a message which is addressed to an individual authorized participant, the members of a group of authorized participants, or all authorized participants, as previously described. At step 1202, an administrative server 106 of a first PSN (PSN 1) receives the message and, at step 1204, forwards the message to each counterpart administrative server 106 for each PSN which is linked to PSN 1.

Next, at step 1206, following receipt of a forwarded message, each administrative server 106, through its PSN administrative application 216, determines whether any addressee(s) of the forwarded message is part of the PSN associated with that administrative server. If not, at step 1208, administrative server 106 is done. If so, then at step 1210 administrative server 106 creates a push notification distribution for the forwarded message in a manner similar to that described above. At step 1212, the forwarded message is received.

Figure 13:
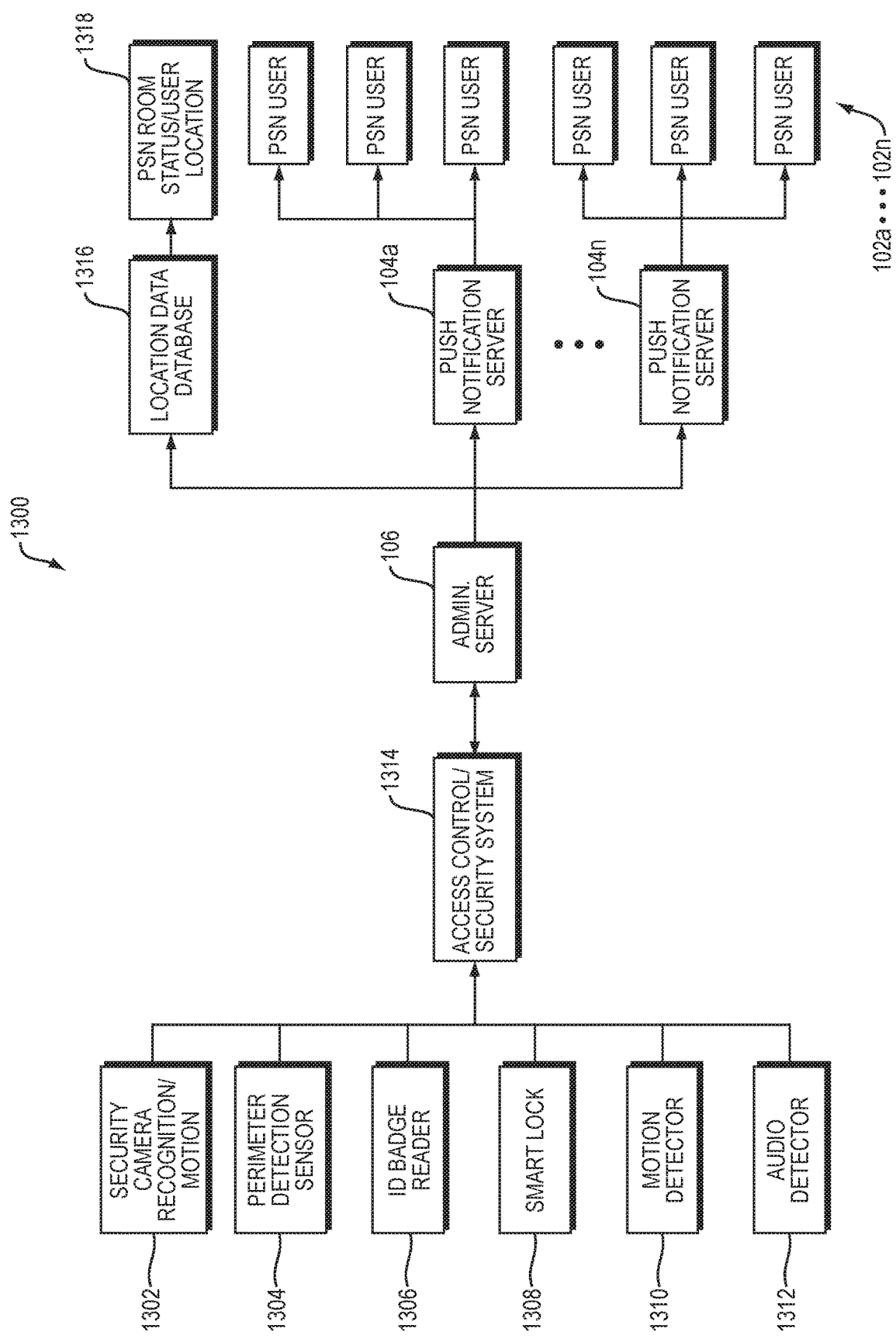
FIG. 13 is a block diagram of an alternative embodiment of a PSN which is arranged to receive and distribute messages originating from one or more security devices in accordance with one aspect of the invention.

FIG. 13 shows an enhanced PSN 1300 which is arranged to accept messages originating from a variety of security devices 1302-1312 and distribute such messages to authorized participants as described above. Security device 1302 may represent a closed circuit security camera which functions to perform facial recognition or motion detection. Security device 1304 represents a perimeter detection sensor. Security device 1306 represents an ID badge reader. Security device 1308 represents a smart lock. Security device 1310 represents a motion detector, and security device 1312 represents an audio detector. Various combinations of security devices 1302-1312, or other types of security devices (not shown), may represent "legacy" equipment (i.e., equipment which pre-dates installation of a PSN at a given facility), or may represent new equipment installed contemporaneously with a PSN.

An access control management/security system (ACM) 1314 provides a communication interface to each of security devices 1302-1312. ACM 1314 may represent, for example, a commercially available system offered by Avigilon or Milestone Systems among others. In general, ACM 1314 operates to transmit commands to security devices 1302-

1312 as well as receive sensor data (e.g., sensor name, location, event or alarm type, and possibly a message) from such devices.

If it is capable of doing so, ACM 1314 forwards sensor data to administrative server 106. Alternatively, administrative server 106 may poll ACM 1314 and retrieve sensor data in that fashion. Administrative server 106, in turn, formats sensor data into human-readable notifications or messages and, in conjunction with push notification servers 104a . . . 104n, distributes such messages as virtually real-time, multi-way messages among authorized PSN users (mobile devices) 102a . . . 102n as described in detail above.

In addition, enhanced PSN 1300 includes a location data database 1316 which is populated and updated by administrative server 106. In general, location data database 1316 provides virtually real-time location information with respect to authorized PSN users as well as other persons who may be located by way of ID badge scanners or other devices as described below. Such virtually real-time location information may be viewed by a system administrator or other authorized person using a PSN room status/user location screen 1318, generated by PSN administrative application 216 (FIG. 2), described below.

In order to manage the distribution of messages originating from security devices 1302-1312 to PSN participants, PSN administrative application 216 generates a notification settings page 1400 as shown in FIG. 14. Exemplary types of possible notifications 1402 are listed on a vertical axis of a grid, and groups of PSN participants (users) 1404 are listed on a horizontal axis. Clickable check boxes allow a system administrator to establish desired notification settings. Once the check boxes are correctly set, a system administrator clicks on a Save Notification Settings button 1406 to save the settings.

Figure 15:
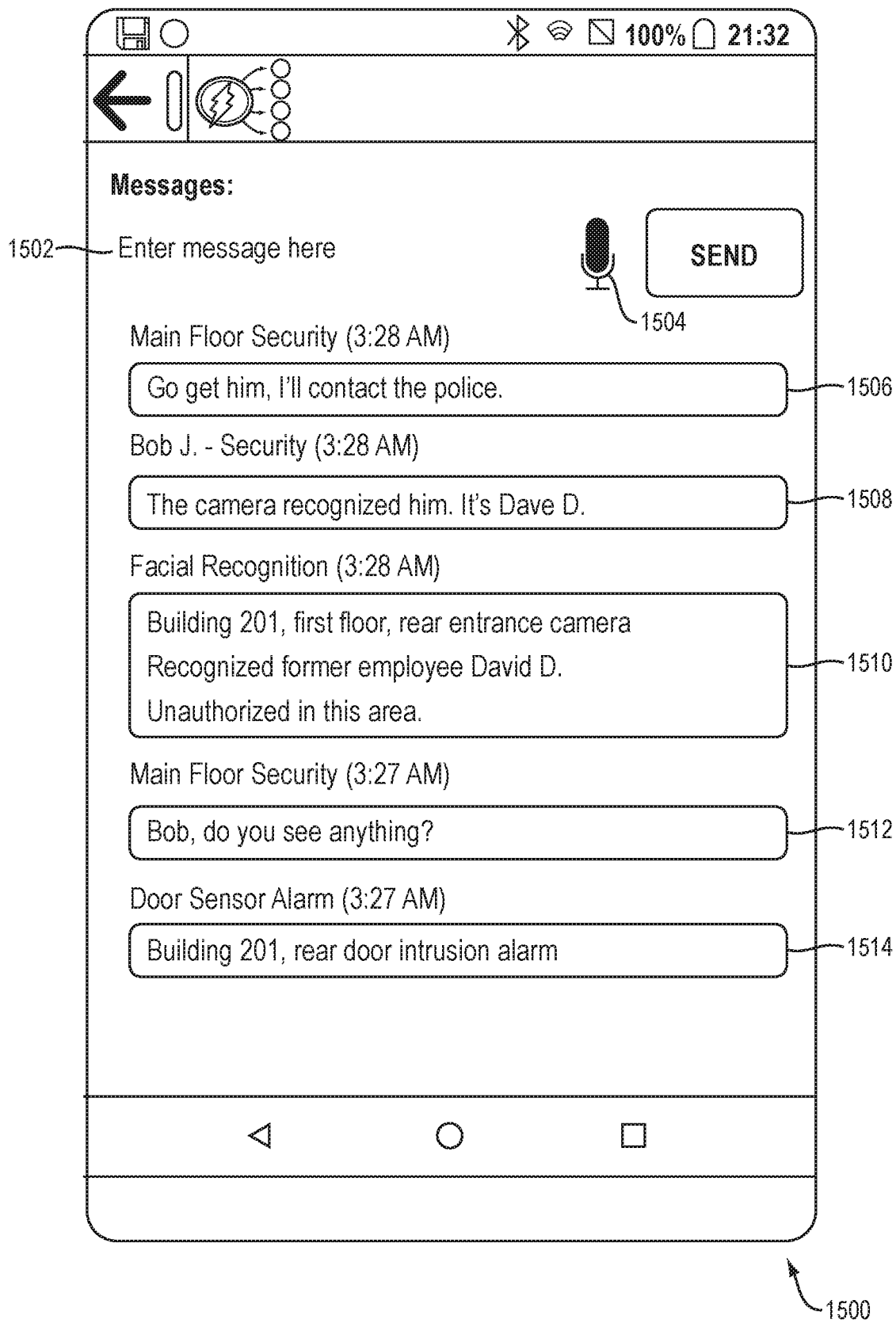
FIG. 15 is a representation of a messages page, generated by the PSN mobile application shown in FIG. 3, which includes messages originating from security devices.

FIG. 15 shows a mobile device 1500 displaying a virtually real-time, multi-way message thread that includes messages originated from PSN participants as well as messages originated from security devices as provided by enhanced PSN 1300. Specifically, each of messages 1506, 1508 and 1512 originated from (was composed by) a PSN participant. Each of messages 1506, 1508 and 1512 may be composed by either typing text in a new message box 1502 (similar to new message box 512 in FIG. 5B), or by pressing microphone icon 1504 to activate speech recognition followed by dictation of the message. Message composition by speech recognition is described in detail below in connection with FIG. 16.

Message 1510 originated from a security camera (not shown) which performed facial recognition and identified a former employee David D. as present in an unauthorized area. One minute earlier, message 1512 originated from a door sensor as an alarm notification that a rear door of Building 201 was forced.

By integrating messages originating from security devices with messages originating from PSN participants, enhanced PSN 1300 provides a clearer, more current view to security personnel of a dynamic situation which, in turn, enables such personnel to make better decisions as to how to address the situation and neutralize any threat. Further, PSN participants who are attempting to evade a threat have better information in deciding which of several possible hiding places or escape routes to select.

Figure 16:
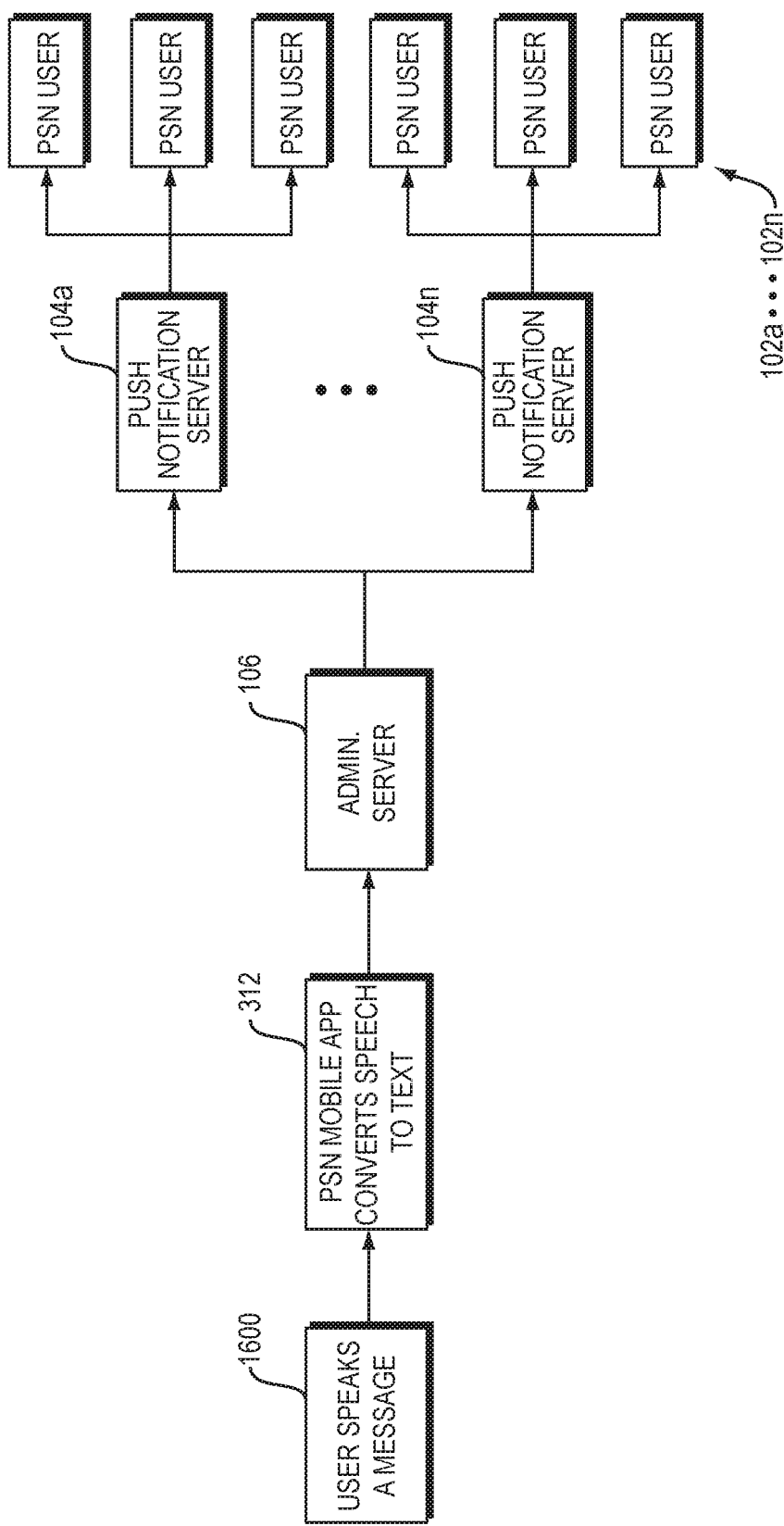
FIG. 16 is a block diagram of an alternative embodiment of a PSN in which a mobile application uses speech recognition to convert spoken words into one or more text-based messages for distribution by the PSN in accordance with one aspect of the invention.

With reference now to FIG. 16, as an alternative to typing messages, a PSN participant may elect to speak a message and leverage speech recognition capabilities embedded in many smartphones, portable (e.g., tablet), wearable (e.g., watch), or other devices. In this alternative embodiment, when a PSN participant (user) presses microphone icon 1504 (FIG. 15) and speaks a message 1600, embedded speech recognition functionality (not shown), in conjunction with PSN mobile application 312 (FIG. 3), converts the speech to text, formats the text into a message, and forwards the message to administrative server 106. Once received by administrative server 106, the message is distributed to the appropriate recipients as previously described.

Figure 17:
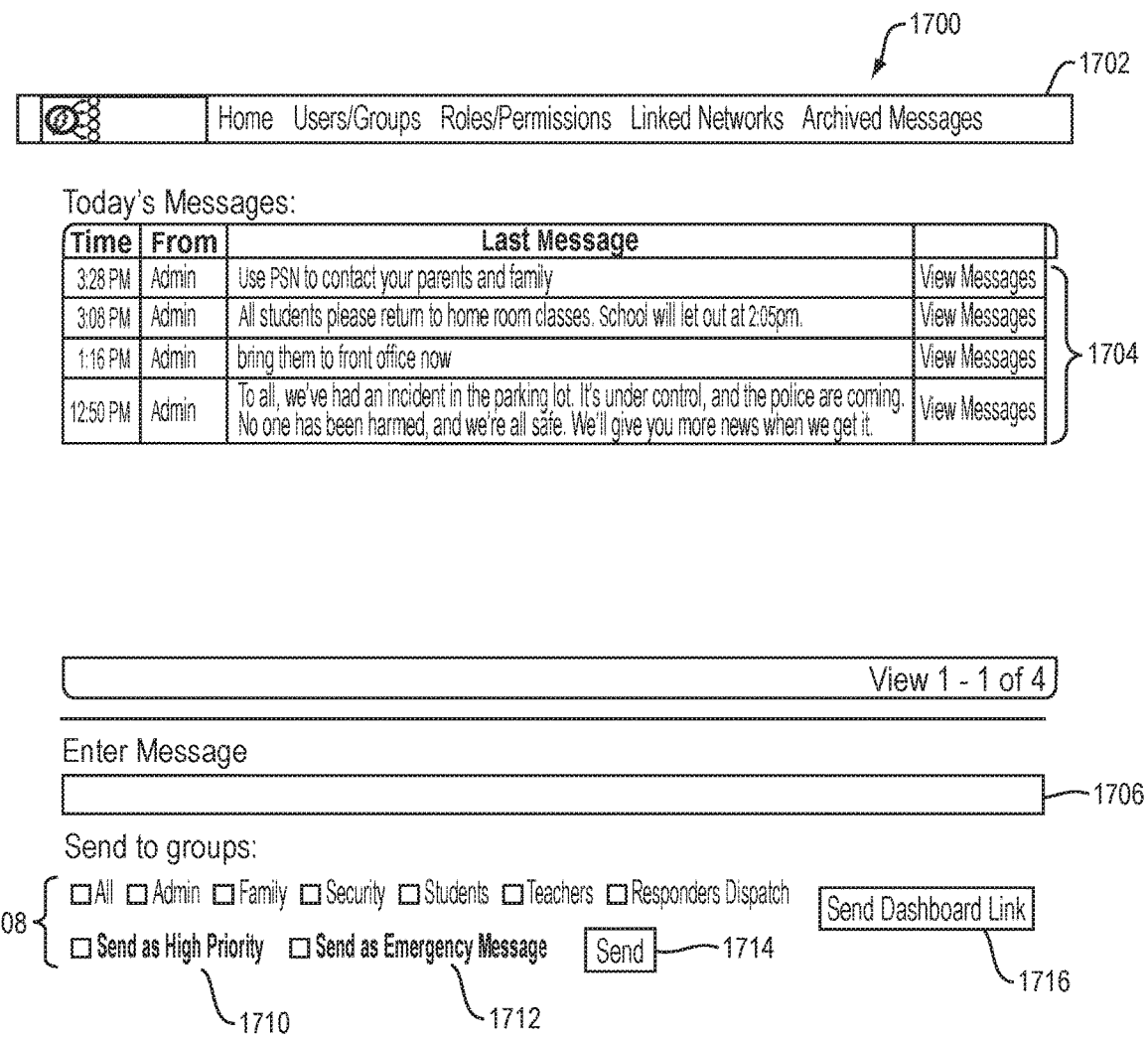
FIG. 17 is a representation of a home page generated by the PSN administrative application shown in FIG. 2 which includes a capability to provide temporary access to the home page for first responders or other authorized entities in accordance with one aspect of the invention.

As described above, in order for an individual to either send or receive messages through the PSN, that individual must have previously registered a device with the PSN. In this regard, the PSN may be considered a private network. However, in case of an emergency, it may be desirable, if not imperative, that first responders, law enforcement, or other individuals who have not previously registered their devices be given access to the virtually real-time, multi-way messaging provided by the PSN. As shown in FIG. 17, this may be done through a home page 1700 generated by PSN administrative application 216 (FIG. 2).

Home page 1700 includes a top level navigation menu 1702 and a recent message threads list 1704. Recent message threads list 1704 displays, in reverse chronological order, a time stamp, message originator, and message text for the most recent message received by administrative application 216 for a given thread. By clicking a View Messages button corresponding to a given thread displayed in recent message threads list 1704, an administrator may view the entire thread as well as contribute new messages to that thread as described previously.

A new message box 1706 is provided for an administrator (not shown) to compose new messages. Intended recipient check boxes 1708 enable an administrator to specify one or more groups of authorized PSN participants as the intended recipient(s) of the next message sent by the administrator. A high priority checkbox 1710, if checked, specifies that the next message sent by the administrator receives highest priority (except for emergency priority) for delivery to the intended recipients. An emergency message checkbox 1712 enables an administrator to designate the next message sent as emergency priority for delivery. By clicking a send button 1714, an administrator sends a new message (as it appears in new message box 1706) to the intended recipient(s).

Should an administrator wish to provide someone temporary access to the recent message threads list 1704 (and underlying messages), he or she may press a Send Dashboard Link button 1716. The result is the creation of a link (not shown) that may be transmitted by email or text to a first responder or other authorized individual. The link provides the recipient with temporary, limited access to recent message threads list 1704 as shown in FIG. 18A. However, the access provided by the link is limited and blocks access to new message box 1706 and other functions needed to create and send a new message, and also blocks access to top level navigation menu 1702. The link also allows access to the underlying messages, as shown in FIG. 18B, by clicking on one of associated View Messages buttons 1800.

Figure 19:
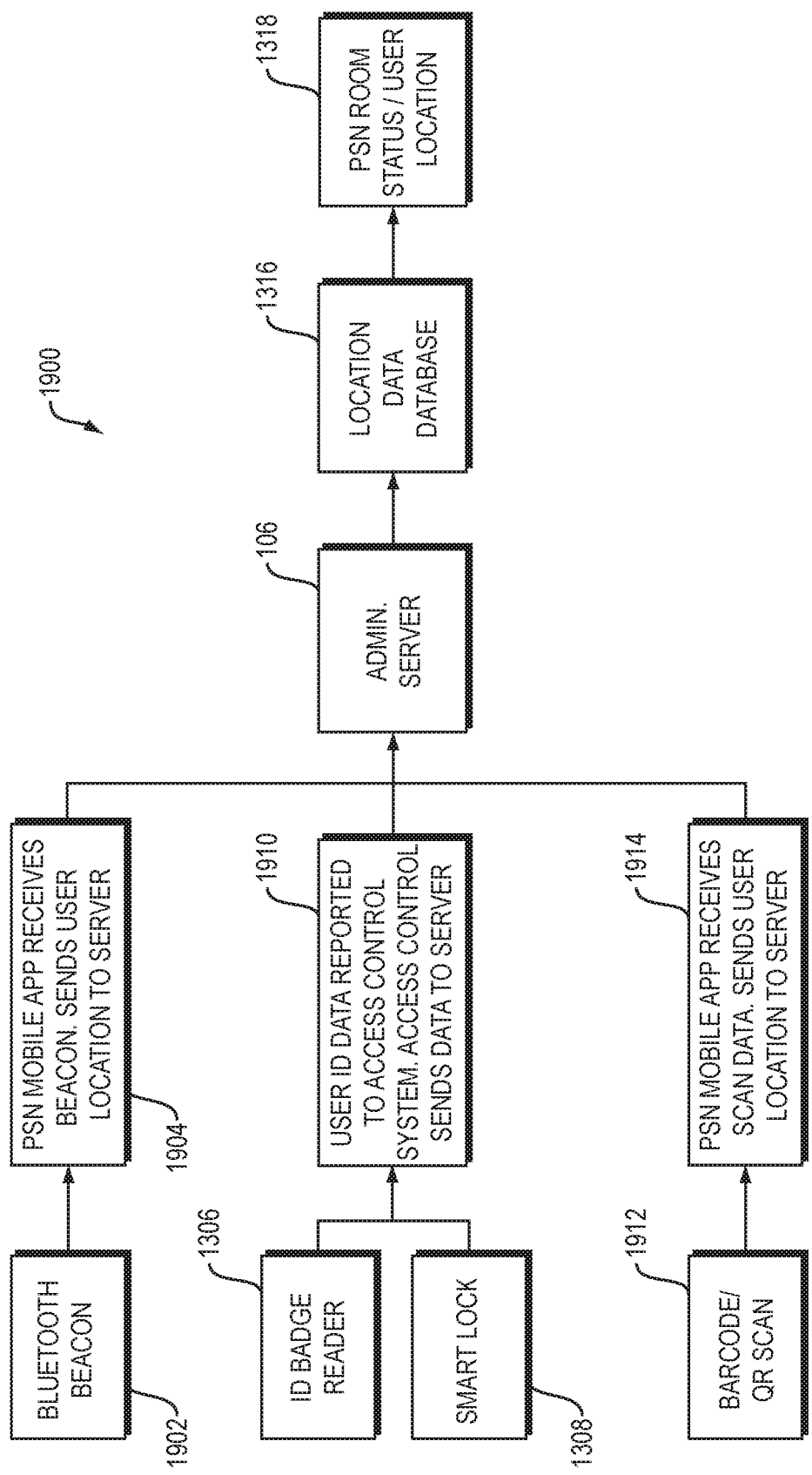
FIG. 19 is a block diagram of an alternative embodiment of a PSN which is arranged to receive location information regarding authorized participants of the PSN originating from one or more location-determining devices in accordance with one aspect of the invention.

FIG. 19 shows a PSN 1900 which is arranged to capture virtually real-time location information, from a variety of sources, regarding a population of interest. One such source is a Bluetooth® beacon 1902 which may represent a commercially available device that is typically placed in a known, fixed location. An RF beacon signal transmitted by Bluetooth® beacon 1902 may be received by mobile device 102a (FIG. 3) or other device which is Bluetooth® enabled and running PSN mobile application 312. Having determined a location from the received beacon signal, PSN mobile application 312 sends the location 1904 to administrative server 106. In response, administrative server 106 updates the current location of the registered mobile device 102a (and, by implication, the registered user of mobile device 102a) in location data database 1316.

In addition, or as an alternative, to Bluetooth® beacon 1902, virtually real-time location information may be obtained from ID badge reader 1306 (FIG. 13). ID badge reader 1306 may represent a commercially available device capable of reading ID badges which contain information that is magnetically or RF encoded. Smart lock 1308 may represent a commercially available device which typically replaces a keyed door lock and is operable by a digital key or remotely through wireless network connectivity. Both ID badge reader 1306 and smart lock 1308 transmit sensor data (e.g., sensor name, location, event or alarm type, and possibly a message) to ACM 1314 which sends the data 1910 to administrative server 106. Administrative server 106 updates the current location of the individual whose ID badge was scanned, or whose digital key or network account was used to actuate smart lock 1308, in location data database 1316.

In addition, or as an alternative, to the devices described above, a barcode/QR scanner 1912 may be used to collect virtually real-time location information. Barcode/QR scanner 1912 may represent functionality embedded in mobile device 102a other device which is capable of optically scanning barcodes or QR codes (or both) and which is running PSN mobile application 312. IDs, attendance lists, or other media bearing barcodes or QR codes may be scanned to provide a virtually real-time location of a person associated with an ID, attendance list, or other media. PSN mobile application 312 sends the scan data 1914 to administrative server 106. In response, administrative server 106 updates the current location of the registered user of mobile device 102a in location data database 1316.

Figure 20A:
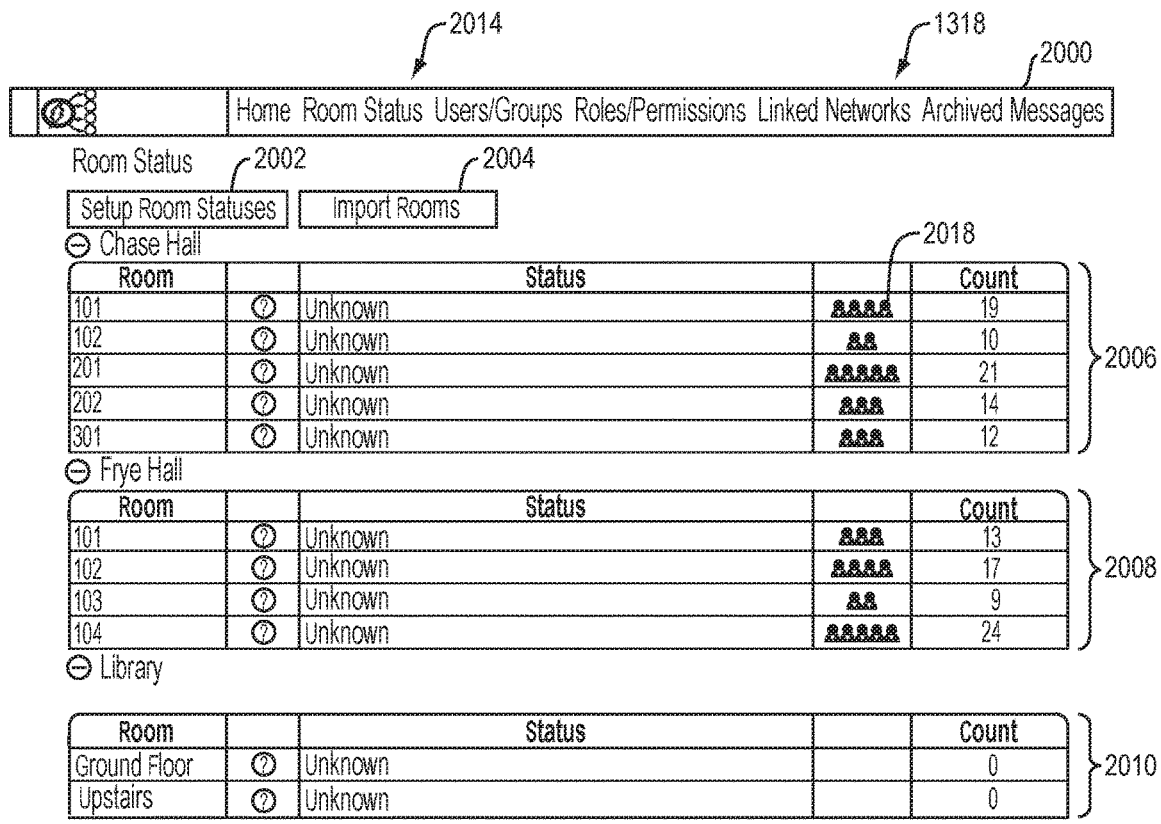
FIG. 20A is a representation of a facility-wide room status/user location page as shown in FIG. 13.
Figure 20B:
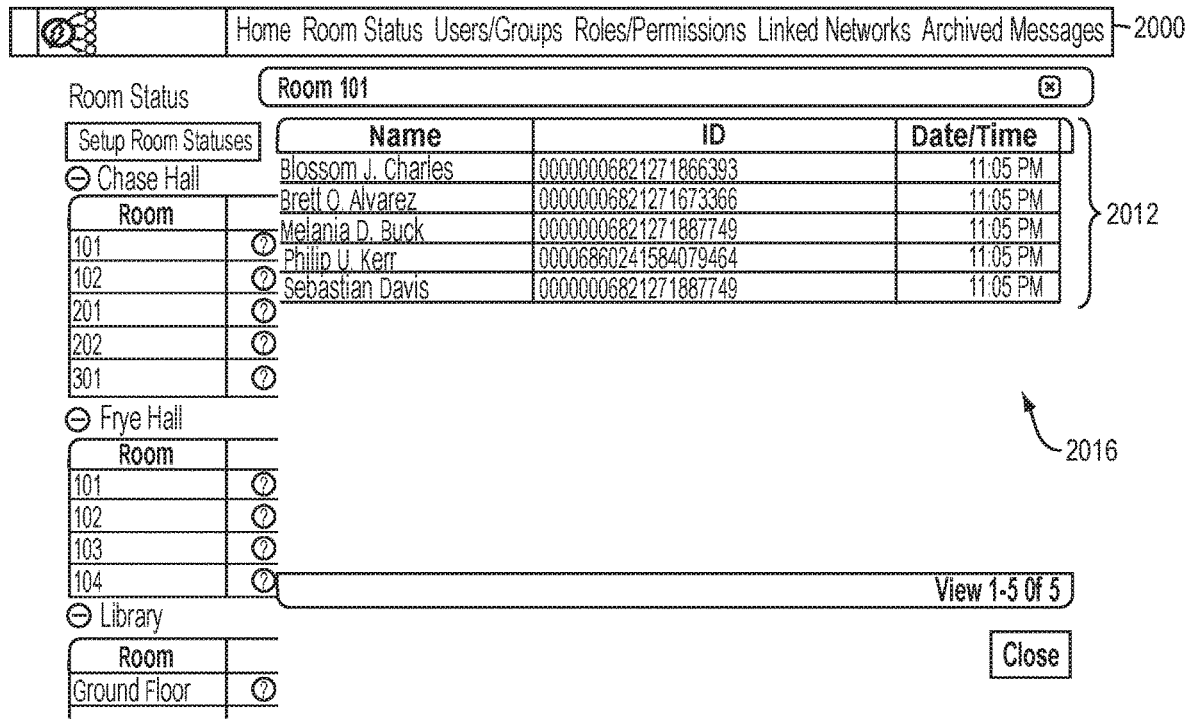
FIG. 20B is a representation of a specific room status page accessible through the facility-wide room status/user location page of FIG. 20A.

Location information maintained in location data database 1316 may be viewed by a system administrator or other authorized person using PSN room status/user location screen 1318, generated by PSN administrative application 216, as shown in FIG. 20A. A top level navigation menu 2000 includes a Room Status button 2014 which, when clicked, navigates to PSN room status/user location screen 1318. A Setup Room Statuses button 2002 is displayed along with an Import Rooms button 2004, both of which may be used to initially configure rooms (or buildings) of interest for a given facility. As shown in FIG. 20A, three buildings, Chase Hall, Frye Hall, and Library, each having multiple individual rooms, were previously configured. For each individual room, PSN room status/user location screen 1318 displays a room number, status, and current headcount of persons in the room.

To access more detailed information on the individuals in a particular room, an administrator clicks on a people icon 2018 for a given room which causes PSN administrative application 216 to navigate to room detail screen 2016. Room detail screen 2016 displays a list 2012 of individuals believed to be present in the selected room based on the most recently captured location information present in location data database 1316. More specifically, for each individual believed to be present in the selected room, room detail screen 2016 displays the individual's name, ID number, and a date/time stamp reflecting when location information for the individual was last captured.

Figure 21:
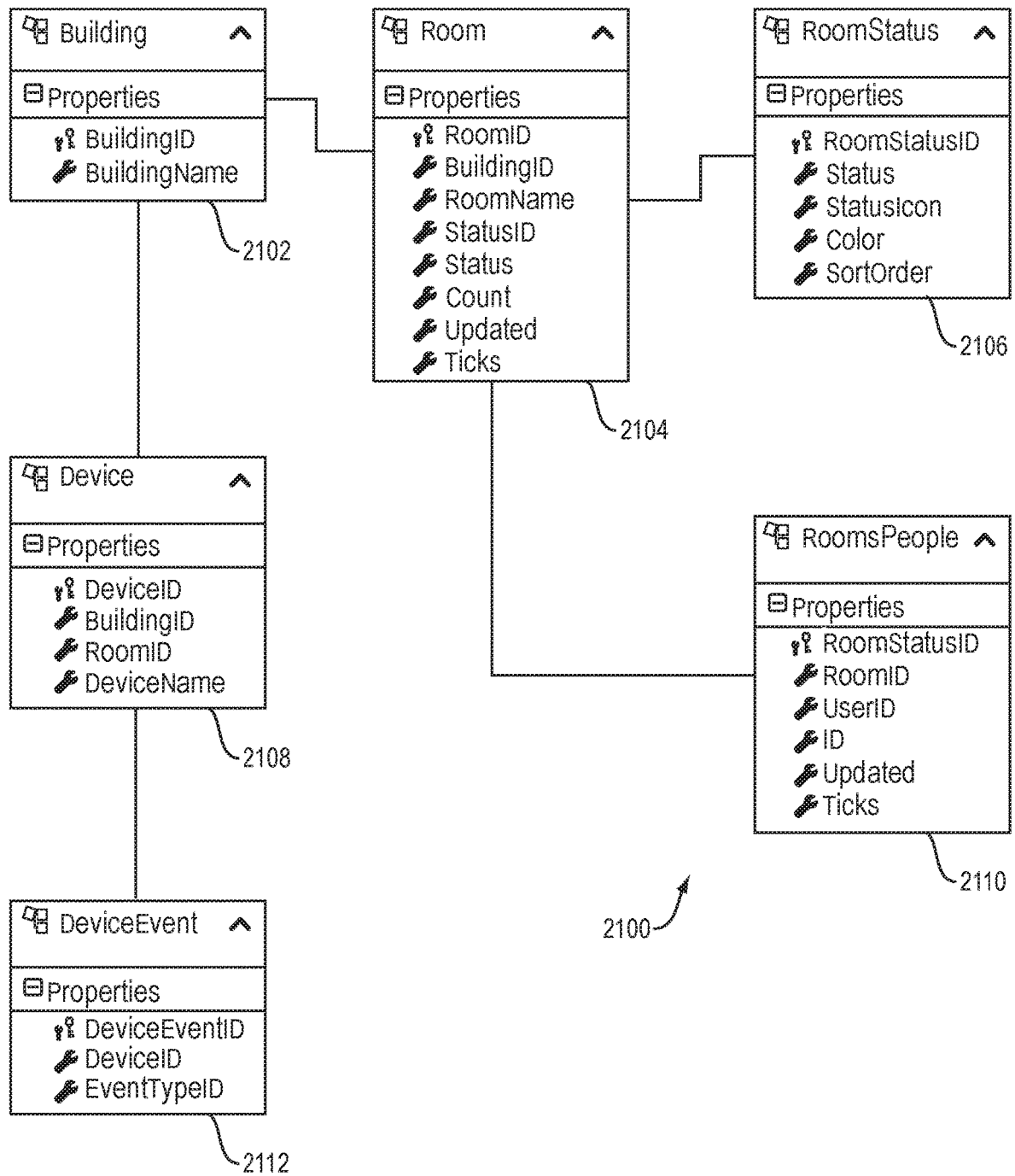
FIG. 21 illustrates examples of data structures which may be used to implement the location data database shown in FIG. 13 as well as generate the pages shown in FIGS. 20A and 20B.

FIG. 21 shows examples of PSN data structures 218 (FIG. 2) used by PSN administrative application 216 in connection with location data database 1316 (FIG. 13). A Building object 2102 and a Room object 2104 together specify information needed to configure a building and individual rooms within the building.

A Device object 2108 corresponds with a device such as ID badge reader 1306, smart lock 1308, Bluetooth® beacon 1902, barcode/QR scanner 1912, or other device which is a source of virtually real-time location information for a population of interest (e.g., students, faculty and staff of a university). A DeviceEvent object 2112 corresponds with events which may be generated by an associated device (e.g., a smart lock is opened by a digital key assigned to a maintenance supervisor).

A RoomStatus object 2106 corresponds with the current status of an individual room as displayed on PSN room status/user location screen 1318. A RoomsPeople object 2110 corresponds with the individuals who, based on most recently captured location information, are believed to be present in a particular room as displayed on room detail screen 2016.

In the case of an emergency event that may be witnessed by a large number of people almost simultaneously (e.g., an explosion in a power plant on a university campus), it is likely that a large number of messages will be sent by authorized participants of a PSN within just a few minutes. Most of those messages will be duplicative of each other as they are all essentially reporting the occurrence of the event and little or nothing else. The congestion and demand on processing resources created by a large burst of incoming messages are potentially problematic for the smooth functioning of any responder network including the PSN. This problem, however, may be mitigated through pre-processing and de-duplication.

Figure 22:
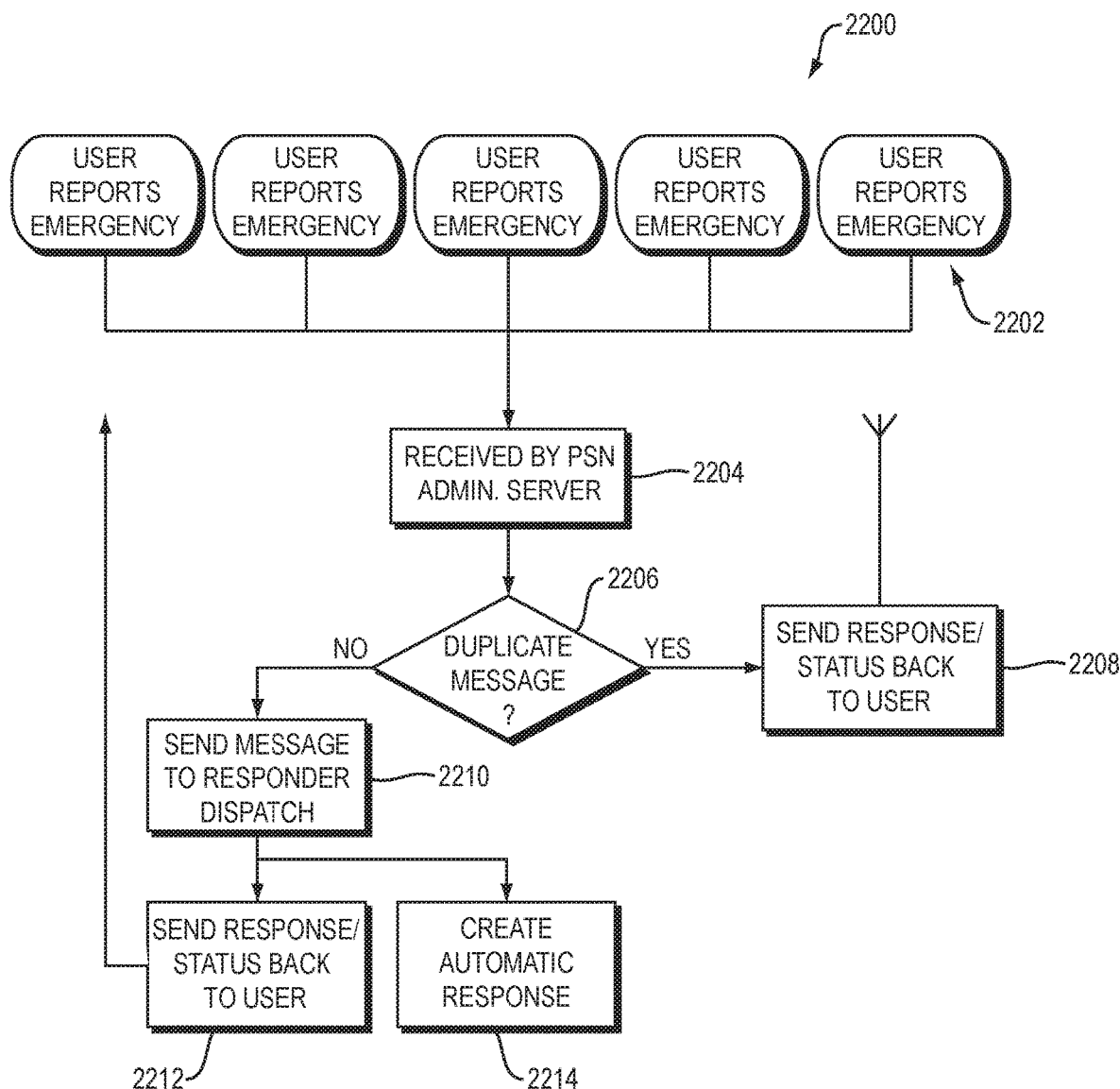
FIG. 22 is a flowchart illustrating an alternative embodiment of a PSN which provides pre-processing and de-duplication of messages originating from authorized participants of the PSN.

As shown in FIG. 22, pre-processing method 2200 begins with a large number of authorized participants (users) of a PSN originating messages to report 2202 the same emergency or other event. Such messages are received 2204 by administrative server 106. Based on the number of received messages per unit of time exceeding a predetermined threshold or similar criteria, or simply to run as a continuous process, PSN administrative application 216 initiates a de-duplication method 2206. When a given received message is determined to be an effective duplicate (i.e., not necessarily a literal duplicate, but duplicative in substance) of an earlier message, method 2200 advances to send a pre-composed response/status (e.g., "We are aware of the explosion and first responders are on the way") 2208 to the user which originated the duplicate message.

Conversely, when a given received message is determined not to be a duplicate of an earlier message, method 2200 advances to send (forward) the message to responder dispatch 2210 for further attention. Next, method 2200 advances to both send a response/status 2212 to the user who originated the non-duplicate message (e.g., "Thank you for reporting the trash can fire outside the Physics building. FD is on the way."), as well as create an automatic response which will be sent to other users who originate duplicate messages (e.g., "We are aware of the trash can fire outside the Physics building. FD is on the way.").

Figure 23:
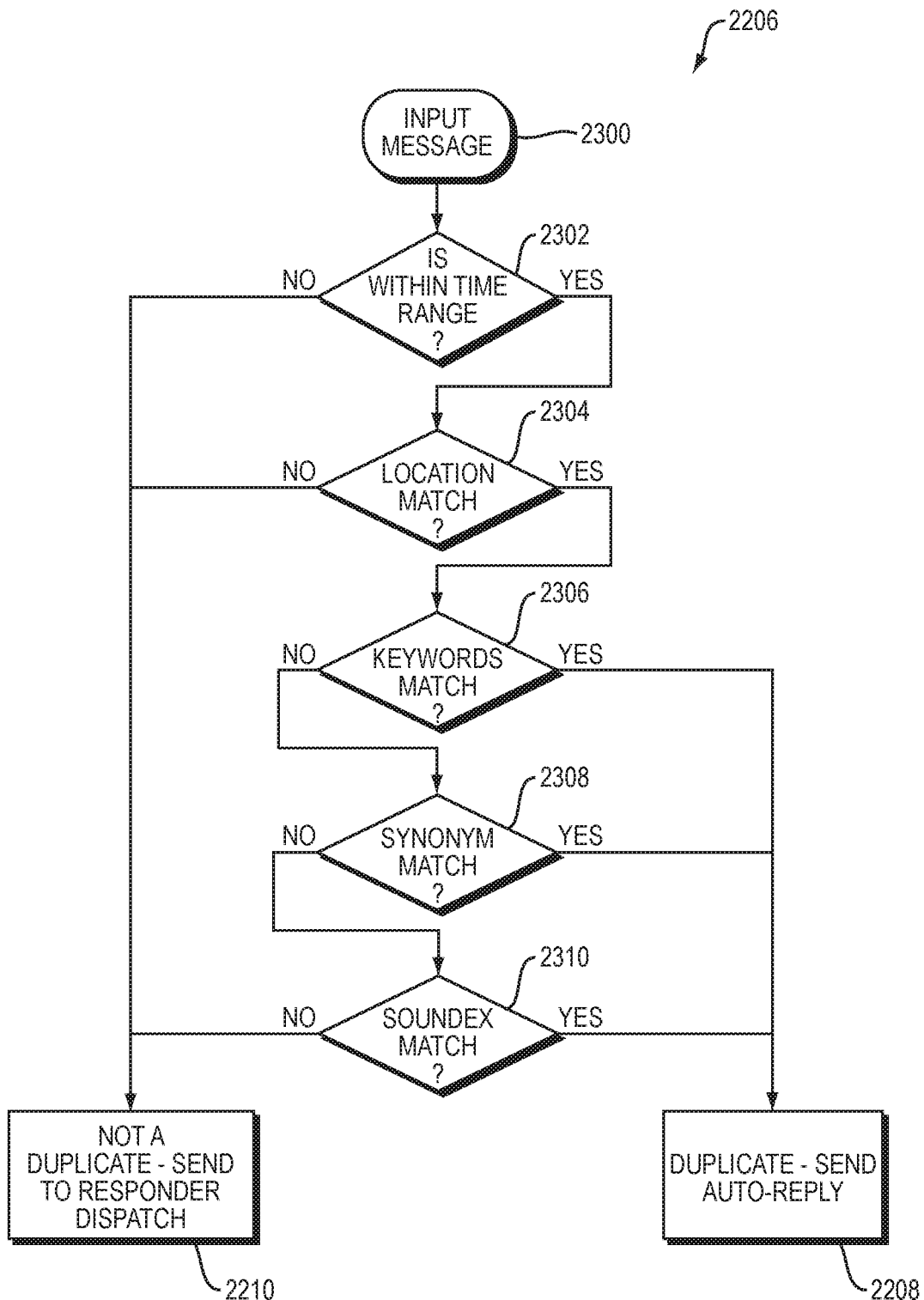
FIG. 23 is a flowchart illustrating in greater detail the de-duplication of messages shown in FIG. 22.

Turning now to FIG. 23, details of de-duplication method 2206 are shown. At step 2300, an input message is received. At step 2302, a timestamp (not shown) associated with the input message is compared with a time range that relates to the time when a previous message reporting a particular event was received ("reference message"). If the timestamp of the input message is not sufficiently close in time (not within the time range) to the reference message, the input message is deemed to be a non-duplicate and method 2206 advances to step 2210 (FIG. 22).

Conversely, if the timestamp of the input message is within the time range, method 2206 advances to step 2304 where a location mentioned in the input message (or possibly a location from which the input message originated) is compared with the corresponding location of the reference message. If there is no location match, method 2206 again advances to step 2210. If there is a location match, method 2206 advances to step 2306.

At step 2306, a comparison is made between keywords recited in the input message and keywords found in the reference message. If there are matching keywords, method 2206 advances to step 2208 indicating that the input message is a duplicate of the reference message.

If there are not matching keywords, method 2206 advances to step 2308 and determines whether there is a synonym in the input message which corresponds to a keyword in the reference message. If so, method 2206 again advances to step 2202. If not, method 2206 advances to step 2310.

At step 2310, a Soundex comparison is made between the input message and the reference message to determine whether, despite differences in spelling of certain words, the messages are referring to the same event. If there is a Soundex match, method 2206 advances to step 2208. If not, method 2206 advances to step 2210.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A personal safety network comprising:
   a plurality of wireless communication devices, each of said wireless communication devices associated with one of a plurality of authorized personal safety network participants, each of said wireless communication devices running a mobile application operable to register with an administrative server, to originate messages by a first one of said plurality of authorized personal safety network participants, to wirelessly transmit said messages to said administrative server, and wirelessly receive push notifications related to said messages from a push notification server;
   said administrative server running an administrative application, said administrative application operable to create and maintain an identification record for each of said plurality of authorized personal safety network participants, to organize said plurality of authorized personal safety network participants into members of one or more groups, each of said members having a personal safety network permission, said personal safety network permission enabling each of said messages to be effectively addressed to a second one of said plurality of authorized personal safety network participants or each of the members of at least one of said one or more groups, to convert at least one of said messages into a first push notification distribution, and to forward said first push notification distribution to said push notification server;
   one or more security devices interfaced with an access control management system, said access control management system in communicating relationship with said administrative server, said access control management system operable, in response to receiving sensor data from any of said one or security devices, to communicate said sensor data to said administrative server;
   said administrative server operable to format said sensor data into one or more human-readable sensor data messages, to convert at least one of said human-readable sensor data messages into a second push notification distribution, and to forward said second push notification distribution to said push notification server;
   said push notification server coupled in communicating relationship with said administrative server, said push notification server operable, in response to receiving said first push notification distribution or said second push notification distribution, to transmit push notifications, which include information from at least one of said messages or at least one of said human-readable sensor data messages, to each of said plurality of wireless communication devices which is associated with each of the authorized personal safety network participants to whom said at least one of said messages is addressed; and
   wherein said plurality of mobile devices, said administrative server, and said push notification server cooperate to enable distribution of virtually real-time, multi-way, messaging among all of the members of said at least one of said one or more groups.

2. The system as in claim 1 wherein said access control management system forwards said sensor data to said administrative server.

3. The system as in claim 1 wherein said administrative server polls said access control management system to retrieve said sensor data.

4. The system as in claim 1 wherein at least one of said one or more security devices is a video camera.

5. The system as in claim 1 wherein at least one of said one or more security devices is a perimeter detection sensor.

6. The system as in claim 1 wherein at least one of said one or more security devices is an ID badge reader.

7. The system as in claim 1 wherein at least one of said one or more security devices is a smart lock.

8. The system as in claim 1 wherein at least one of said one or more security devices is a motion detector.

9. The system as in claim 1 wherein at least one of said one or more security devices is an audio detector.

10. The system as in claim 1 wherein said administrative server maintains a location data database, said location data database providing virtually real-time location information with respect to one or more persons, said virtually real-time location information originating from one or more of said plurality of wireless communication devices, or one or more of said one or more security devices, or one or more location beacons.

11. The system as in claim 1 wherein said mobile application is operable, in conjunction with a speech recognition capability embedded in at least one of said plurality of wireless communication devices, to enable at least one of said authorized personal safety network participants to originate messages by speaking.

12. The system as in claim 1 wherein said administrative application is operable to provide temporary, limited access to said virtually real-time, multi-way, messaging to one or more individuals.

13. A method for reducing congestion in a network which distributes virtually real-time, multi-way, messaging among a plurality of authorized network participants, said method comprising the steps of:

receiving at an administrative server a first message originating from a first one of said plurality of authorized network participants;

designating said first message as a reference message;

receiving at said administrative server a second message originating from a second one of said plurality of authorized network participants;

determining whether said second message is an effective duplicate of said reference message;

when said second message is determined to be an effective duplicate of said reference message, said administrative server does not distribute said second message to any of said plurality of authorized network participants; and when said second message is determined not to be an effective duplicate of said reference message, said administrative server distributes said second message in accordance with a protocol for providing virtually real-time, multi-way, messaging among said plurality of authorized network participants.

14. The method as in claim 13 wherein said determining is done at least in part by comparing a first timestamp associated with said reference message with a second timestamp associated with said second message.

15. The method as in claim 13 wherein said determining is done at least in part by comparing a first location associated with said reference message with a second location associated with said second message.

16. The method as in claim 13 wherein said determining is done at least in part by comparing a plurality of keywords found in said reference message with said second message.

17. The method as in claim 13 wherein said determining is done at least in part by determining whether said second message includes a synonym for a keyword found in said reference message.

18. The method as in claim 13 wherein said determining is done at least in part by making a Soundex comparison between said reference message and said second message.

19. The method as in claim 13 wherein when said second message is determined not to be an effective duplicate of said reference message, said administrative server sends a response to said second one of said plurality of authorized network participants.

20. The method as in claim 13 wherein when said second message is determined not to be an effective duplicate of said reference message, said administrative server creates an automatic response intended for a subsequently received third message which is determined to be an effective duplicate of said second message.

* * * * *